US008647199B2

(12) United States Patent
Luciano, Jr. et al.

(10) Patent No.: US 8,647,199 B2
(45) Date of Patent: *Feb. 11, 2014

(54) BINGO GAME SYSTEM AND METHOD

(75) Inventors: Robert A. Luciano, Jr., Reno, NV (US); Warren R. White, Fife, WA (US)

(73) Assignee: Bally Gaming, Inc., Las Vegas, NV (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/881,087

(22) Filed: Sep. 13, 2010

(65) Prior Publication Data

US 2011/0009180 A1 Jan. 13, 2011

Related U.S. Application Data

(63) Continuation of application No. 12/359,147, filed on Jan. 23, 2009, now Pat. No. 7,794,319, which is a continuation of application No. 10/772,543, filed on Feb. 5, 2004, now Pat. No. 7,481,707.

(60) Provisional application No. 60/451,970, filed on Mar. 3, 2003.

(51) Int. Cl.
*G06F 17/00* (2006.01)

(52) U.S. Cl.
USPC .......... 463/31

(58) Field of Classification Search
USPC .......... 463/16–25, 42
See application file for complete search history.

(56) References Cited

U.S. PATENT DOCUMENTS

| | | | | |
|---|---|---|---|---|
| 6,079,711 | A * | 6/2000 | Wei et al. | 273/269 |
| 7,731,581 | B2 * | 6/2010 | Chamberlain et al. | 463/19 |
| 2005/0187014 | A1 * | 8/2005 | Saffari et al. | 463/27 |
| 2006/0019737 | A1 * | 1/2006 | Yang | 463/19 |
| 2007/0060288 | A1 * | 3/2007 | Willyard et al. | 463/19 |
| 2007/0257430 | A1 * | 11/2007 | Hardy et al. | 273/139 |

* cited by examiner

*Primary Examiner* — Ronald Laneau
(74) *Attorney, Agent, or Firm* — Marvin Hein

(57) ABSTRACT

Presented is a system and method for generating bingo game bonuses that are non-banked, for use with pooled bingo games. The system generates pools of money for use in bingo games by deducting a percentage of the amount used to purchase bingo cards (in the present invention, virtual bingo cards). Each bingo game automatically enrolls active players in one or more bonus games, exemplified by "4 corners," where the amounts to be given away to players as bonuses are calculated to be equal, over time, to the amount taken in from players buying bingo cards. The house has no stake in the bonus awards.

14 Claims, 19 Drawing Sheets

Example Bingo Terminal Screen With Complex Entertainment

Bingo Game System Enabling A Plurality Of Parallel Sessions And Multiple Games Within Each Session Bingo Game System Components Bingo Game System Running A Plurality Of Parallel Sessions And Multiple Games Within Each Session Logical Relationships Between Bingo Game Managers, Games, And Sessions From Previous Figure Bingo Prize Pool Construction Prize Pool Generation

Figure 8

Example Tables From A 32 Stop/Reel, 3 Reel, Evenly Weighted, Single Payline Slot Machine

| Combination | Reel 1 | Reel 2 | Reel 3 | Total Hits | Pay | Total Pay |
|---|---|---|---|---|---|---|
| ☼ ☼ ☼ | 2 | 2 | 2 | 8 | 1200 | 9600 |
| 3Bar 3Bar 3Bar | 3 | 3 | 3 | 27 | 90 | 2430 |
| 2Bar 2Bar 2Bar | 4 | 4 | 4 | 64 | 60 | 3840 |
| Bar Bar Bar | 6 | 6 | 6 | 216 | 30 | 6480 |
| Face Face Face | 1 | 1 | 1 | 1 | 15 | 15 |
| Any Any Face | 26 | 26 | 1 | 676 | 2 | 1352 |
| Any Face Any | 26 | 1 | 26 | 676 | 2 | 1352 |
| Face Any Any | 1 | 26 | 26 | 676 | 2 | 1352 |
| Any Face Face | 26 | 1 | 1 | 26 | 6 | 156 |
| Face Any Face | 1 | 26 | 1 | 26 | 6 | 156 |
| Face Face Any | 1 | 1 | 26 | 26 | 6 | 156 |
| Blank Blank Blank | 16 | 16 | 16 | 4096 | 1 | 4096 |
| | | | | | | |
| Total | | | | 6518 | | 30985 |

Table 8A

Used To Generate Pool Elements

| Reel Wins | 1 Coin | 2 Coin | 3 Coin |
|---|---|---|---|
| ☼ ☼ ☼ | 1200 | 2400 | 3600 |
| ≡ ≡ ≡ | 90 | 180 | 270 |
| ═ ═ ═ | 60 | 120 | 180 |
| – – – | 30 | 60 | 90 |
| ☺ ☺ ☺ | 15 | 30 | 45 |
| Any Two ☺ ☺ | 6 | 12 | 18 |
| Any One ☺ | 2 | 4 | 6 |
| Three Blanks | 1 | 2 | 4 |

Table 8B

Visible To Players On Slot Machine

Using Bingo Prize Pools

Bingo Card
Generation

Running A Game Session

Running A Game Session Continued

Bingo Game System According To The Present Invention

Player-Funded Progressive Bingo Game

Player-Funded Bonus In A Bingo Game

Relationship Between A Bingo Session Ball Draw And Ball Sequences Sent To Individual BPTs

Relationship Between A Bingo Session Ball Draw And Ball Sequences Sent To Individual BPTs Determining A Number Of Prizes To Award Per Game Using A Participation Percentage (PP)

Running A Game Session With Multi-Wager-Level Games

BINGO GAME SYSTEM AND METHOD

RELATED APPLICATION(S)

The present application is a continuation of U.S. patent application Ser. No. 12/359,147, filed on Jan. 23, 2009, now U.S. Pat. No. 7,794,319 which is a continuation of application Ser. No. 10/772,543, filed on Feb. 5, 2004, now U.S. Pat. No. 7,481,707, which claims the benefit of the filing date of U.S. Provisional Patent Application Ser. No. 60/451,970 filed on Mar. 3, 2003, all of which are hereby incorporated by reference in their entirety for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention pertains generally to automated bingo games. More particularly, the invention is a bingo game system and method that may be operated in either banked or non-banked modes, providing methods for bonus payouts during bingo game play.

2. Description of the Related Art

Traditional bingo games, using paper bingo cards with either manual or automated ball-draw systems, are known. Players buy a bingo card or cards, and when the minimal number of players as determined by the bingo hall or casino are ready to play (can be on the order of 20 per game, but varies widely), the current bingo session is considered closed; players subsequently purchasing cards will play in a future game session. Those having purchased cards for the current bingo game session may be considered "enrolled" in the game about to start. Players currently enrolled watch as a sequence of bingo balls are drawn. The players daub (mark) their cards in squares or spaces corresponding to the balls drawn (alternatively, an electronic card version may be auto-daubed). After a player daubs a pre-specified winning pattern on their card(s) and declares they have won by calling out "bingo", the current game is typically considered over.

Many variants of bingo exist, including the ability to have multiple winners in a single bingo game and the ability for players to participate in progressive jackpots. An example of a bingo game with multiple winners would be to provide a first prize to the first player to cover 5 squares in a row or diagonally, and then a second prize to the first player to complete an "X" pattern consisting of two diagonals.

If a player misses declaring a winning pattern on a card by failing to call out "bingo", the ball draws continue until someone proclaims bingo on a subsequent ball. Further, although there is one (or sometimes more than one) card pattern(s) designated as the game winning patterns (such as filling in a row or column), there are typically other predesignated patterns that enable a player to win additional prizes. Examples include "comers" (filling in each of the four outer corners of your bingo card), "boxes" (e.g., filling in a 2×2 box anywhere on the card) and blackout (covering all the entire card's spaces after using a specified number of drawn balls less than 75). After play stops, players with winning cards are paid. The next game then begins with players enrolling for that game.

With the advent of Amerindian casinos operating under IGRA (25 USC §2701-§2721), where bingo games may be run without entering into state compacts, there has been an increased demand for bingo games providing more varied play, quicker game turn-around, and more betting options than are currently possible.

Additional player interest to broaden the commercial appeal of bingo can be generated by providing additional visual displays after completion of a bingo game, while preserving all the critical defining elements of bingo. One such additional display may be called an entertainment display. Entertainment displays are displays showing the results of bingo games in ways other than a traditional bingo card. This is often displayed to a player by first showing the bingo game's results on a bingo card, followed by a secondary display (may or may not be on the same physical device) where the secondary display shows the same winning amount as the bingo card in an alternate fashion.

There is a need for providing entertainment displays that can realistically mimic reel games or reel machines, plus provide additional or bonus winning opportunities coupled with their own entertainment displays.

SUMMARY OF THE INVENTION

The present invention is a bingo game system and method that provides adherence to the required elements of bingo play, faster individual games, more betting options (a large range of betting amounts), the ability to run the system in both non-banked and banked modes where the non-banked mode provides a fixed or constant operator take, and more entertainment value than has previously been available using both a primary "win" screen (i.e., an entertainment screen corresponding to the win of the primary bingo game) and additional bonus winnings and their associated entertainment screens.

In accordance with one embodiment of the invention, a bingo gaming system includes at least one bingo game manager configured to define a non-bingo game of chance having a set of non-bingo winning outcomes and associated non-bingo prizes, to create a bingo game prize pool comprising elements generated according to the probabilities of the set of non-bingo winning outcomes, each element including a bingo game winning outcome and a bingo prize equal to its generating non-bingo prize. The system further includes one or more player terminals configured to present the bingo game to one or more players until at least one of the selected elements' bingo game winning outcome occurs, and to display a non-bingo winning outcome associated with a non-bingo prize equal to the bingo prize associated with the occurring bingo winning outcome.

In accordance with another embodiment, a bingo gaming system includes at least one bingo game manager configured to define a non-bingo game of chance having a set of non-bingo winning outcomes and associated non-bingo prizes and further configured to create a bingo game prize pool template comprising elements generated according to the probabilities of the set of non-bingo winning outcomes, each element including a bingo game winning outcome and a bingo prize equal to its generating non-bingo prize. The bingo game manager is further configured to create a plurality of bingo game prize pools from the template. The system further includes one or more player terminals configured to present the bingo game to one or more players until at least one of the selected elements' bingo game winning outcome occurs and to display a non-bingo winning outcome associated with a non-bingo prize equal to the bingo prize associated with the occurring bingo winning outcome.

The bingo system of the present invention may be operated in either banked or non-banked modes. The operator in whose establishment the games are being run will chose a mode of operation. In many cases, this will be dictated by local laws. It is currently expected that many, if not most, installations will be run in non-banked mode; however, this will not be known until the system has been installed in several locations, and will be subject to change as applicable state laws change. Due to the predicted preference for the non-banked mode of operations, non-banked modes will be presented in the first portion of the detailed description section below. The banked mode of operation will be explained primarily towards the end of the detailed description section.

Using the system of the present invention in non-banked mode, the system allows play between players where at least two players are enrolled per game, who then play bingo against each other. The system generates a unique bingo card ID per Bingo Game Controller (BGM), or set of BGMs (BGMs described in more detail below), in the form of a 32 bit number, the 32 bit number generated using the output of an RNG; the entire 32 bits may be generated this way, or a portion of the 32 bits may represent a BGM machine ID. A proprietary algorithm is used to generate the full bingo card from the 32 bit card ID. This may be done at any computer in the system, but in particular is done at each Bingo Player Terminal (BPT), where players play. The generated card is displayed in a traditional bingo card manner (i.e., as an N-by-N matrix with numbered squares). The BGM then starts a game by "drawing" (mathematically generating) a full randomly-ordered set of 75 bingo balls. Of the 75 ball sequence just generated, a sequence consisting of the first "n" balls is sent to each enrolled BPT such that "n" is the minimal number of balls including at least one winning pattern on at least one of the cards. "At least one" covers the case where the cards in a bingo game are such that two or more bingo cards show a winning pattern at the same ball number. The method of choosing the sequence (and subsequent sequences) is explained more fully below.

A standard bingo game has 75 balls (B1-B15, I16-I30, N31-N45, G46-G60, and O61-O75). The bingo game system of the present invention is not specific to any ball set and is usable with any superset, subset, or completely alternate set of balls from which to draw. Further, although it is not a preferred embodiment, it is possible to generate drawn ball sets in less than full draws in multiple sequences. All such variations are within the inventive scope of the herein described bingo game system.

In non-banked mode, the bingo game of the present invention makes use of a set of prize pools; prize pools enable operators to keep a constant percentage of wagers made by players (the electronic equivalent of keeping a percentage of the money paid for each bingo card in a traditional paper bingo game), while also enabling multiple betting options and extremely complex reel/payline games to be mimicked in the entertainment display. A prize pool is a pre-defined finite set of prize awards distributed during multiple bingo games in random order.

In a preferred embodiment, there is at least one bingo prize pool for each level of betting. For example, in one embodiment BPTs in one area of a casino floor could offer betting using $0.25 cards, $0.50 cards, and $1.00 cards; in another area of the casino the BPTs could offer betting using $5.00 cards, $10.00 cards and $100.00 cards; each betting level (in this case, the cost of a card) has at least one corresponding bingo prize pool from which prizes, winnings, awards, etc., are drawn and given to a winning player. Bingo prize pools are created before play (a game session) starts, and are used until exhausted (all selections drawn out), over a plurality of bingo games. More details on the creation and use of bingo prize pools are given below, including how to construct a bingo prize pool to enable a constant operator hold ("constant hold"), mimic complex reel games, and provide multiple wagering levels.

Bingo prize pools enable constant-hold bingo game results to be used in the creation of entertainment displays mimicking complex games of chance. One preferred embodiment uses a simulated reel display shown in conjunction with the bingo card display, mimicking the look and feel of spinning reels. The BPT determines which reel display should be shown to correspond to the winning bingo amount, and (after the pseudo-spinning of the video reels) shows that reel display using a reverse mapping algorithm. Thus, if a player chooses, they can look at a video reel type output that displays their bingo winnings. Of particular interest is a new method for generating mappings between high complexity reel games and bingo card results, making here-to-fore unavailable reel games available for use in the entertainment display.

The system of the present invention is particularly good for implementing additional progressive or bonus prizes in bingo games, in addition to the base prize. One preferred embodiment will make use of pools for additional awards to be made at the end of each bingo game. The pools may be simply the regular prize pools, with additional entries in the entertainment game's pay table for additional payouts for the bonus prizes (i.e., the pool is constructed with these additional payouts calculated in). Alternatively, the pools may be designated for use with particular bonus prizes at specified wager levels, and may be awarded on a progressive basis (winner takes all or a significant portion of the pool, and the payout depends on the current status of the pool's value) or a fixed bonus amount basis (in which case the player's contribution amount per wager is calculated to fund the pool just enough to pay the expected payout rate).

BRIEF DESCRIPTION OF THE DRAWINGS

The present invention will be more fully understood by reference to the following drawings, which are for illustrative and explanatory (not limiting) purposes.

FIG. 8 is an illustration of pay-out tables from an exemplar 32 stop/reel, 3-reel, evenly weighted, single payline slot machine.

DETAILED DESCRIPTION OF THE PREFERRED EMBODIMENTS

Figure 1:
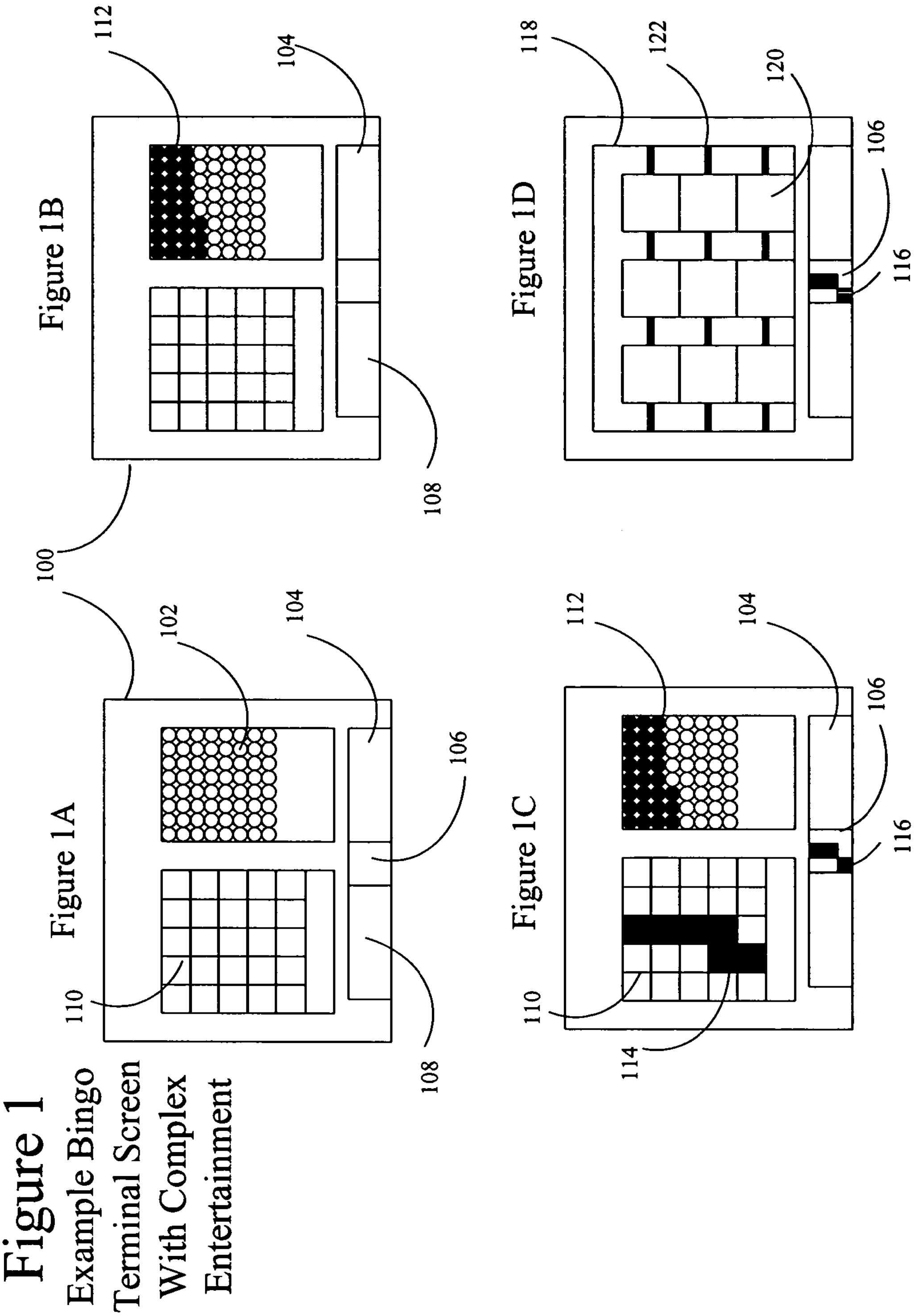
FIG. 1 is an illustration of a bingo player terminal screen according to the present invention.

Persons of ordinary skill in the art will realize that the following description of the present invention is illustrative only and not in any way limiting. Other embodiments of the invention will suggest themselves to such skilled persons who have the benefit of the present disclosure.

Referring to the drawings, for illustrative purposes the present invention is shown embodied in FIGS. 1-19. It will be appreciated that the apparatus may vary as to configuration and as to details of the components, and that the method may vary as to details, specific contents, and the order of any acts without departing from the inventive concepts disclosed herein.

As used in this disclosure, "banked" and "non-banked" refer to the source of winnings derived from a bingo game. "Banked" is used within the gaming art to refer to a game whose winnings come from a casino or bingo hall, and "non-banked" refers to a game whose winnings come from a pool of funds generated by the players themselves. Thus, "banked" operation means the players are playing against the house (operator, casino, bingo hall, or other non-player entity), while "non-banked" operation means the players are playing against themselves (other players), who form or help fund a winnings pool from wagering amounts. In non-banked game operations, the house takes a constant percentage from the wager amounts. This percentage, also called an operator hold, take, or rake, is how a bingo hall, casino, church, or other entity derives income from hosting bingo games.

FIG. 1A illustrates an exemplar bingo game with entertainment display, FIG. 1 applying equally to banked and non-banked modes. Shown is a video display 100 (flatpanel, traditional cathode ray tube, or any other visual display means) that is part of a bingo player terminal (BPT) of the present invention. Bingo card 110 is displayed, having numbers in each square according to normal bingo rules. Empty ball set 102 is also shown; there will be 75 empty (non-labeled) circles representing balls, to accommodate the full number of bingo balls it is possible to draw in a single game. At the bottom of visual display 100 is a smaller version of bingo card 110, bingo card 106. Also shown are player input area (touchscreen) 108 and message area 104. Before play starts, message area 104 will contain a message such as "Waiting To Start", "Ready To Play", or something similar to let a player know the game is ready for use. Bingo cards 110 and 106 may be blank or have a "pre-play" or "display" set of numbers shown, as game designers see fit. Likewise with the drawn bingo ball set 102 before actual game play starts; there may be blank balls, a previous ball draw, or a standard ball display. Various attract mode displays may be used as well. One embodiment will have the balls blank while waiting for a player, providing further visual indicia the game is ready for play. In yet another embodiment a sequence of images showing exemplar game plays is shown, which both attracts players and illustrates to new players how to play the game.

FIG. 1B shows visual display 100 after a player has begun play, and a set of balls has been drawn. The initial ball set 112, a subset of the full ball draw, will vary with each game as described more fully below. Ball set 112 is shown as dark due to the limitations of this graphic representation, but the actual visual display will typically have numbers inside each ball showing the drawn ball numbers and their order (received from a BGM). The message in 104 will now display a message such as "Daub Now" or something similar, coupled with a visual timer (not shown). The visual timer could take many forms, including a small clock-face showing a second-hand running towards 12; a color-bar with green to the right of a divider and red to left—as time goes buy, the divider moves from right to left showing less green (less time) and more red. When the color-bar turns all red, second-hand reaches 12, etc., the player can no longer daub and has missed their chance to win based on this set of balls. To daub, the player touches touchscreen input area 108, containing a daub indicator area therein.

As will be understood by those knowledgeable in this art, touchscreen input is a single exemplar of a user input device; any user input device enabled to send a signal to the electronic, photonic, or other analogue or logic circuitry within a player terminal may be used.

FIG. 1C illustrates the effect of daubing. Any balls in ball set 112 that matched numbers on bingo cards 110 and 106 are marked, and are shown as blanked out areas 114 on card 110 and blanked out areas 116 on small card 106. The actual screen can make use of any means to visually distinguish the "daubed" squares, including but not limited to reverse video imaging, letter/number highlighting, background color changes, etc. This bingo game is now concluded. The player now has a choice of seeing an entertainment display or not, the choice being indicated in display area 104. If a player chooses (alternatively, if the player chose earlier in the game session) to see the entertainment display, the prize results in the form of a game animation are shown in FIG. 1D. Small bingo card 106 with the blanked out (daubed) areas 116 for this game stay on the screen from FIG. 3 to FIG. 4. Screen area 118 now displays an image of slot reels 120 (or simulates another game of chance) having a same win value as bingo card 106 with daubed areas 116. Shown is a multi-payline (122 shows one payline) 3 reel slot type entertainment display.

FIGS. 1A through 1D were shown with a single bingo card and single entertainment display. A single card was used to keep visual clutter to a minimum, as the graphical representation in this application would become unreadable if a plurality of cards were drawn; however, the present invention may be used with any number of cards bought and used by a player. The number of bingo cards in simultaneous play is limited primarily by ergonomic considerations and the available visual elements (screen size and visual clarity or display resolution) of the game machine. Low-end or bar-top machines will typically have small, poor resolution screens which enable the reasonable use of one or perhaps two cards; high-end machines will have larger screens with higher resolution, enabling a plurality of cards to be readably displayed simultaneously. The present invention includes the use of any number of cards on any particular game machine.

Further, any visual method used to enable both a bingo card and the entertainment display to be made visible to a player may be used; exemplars include fading the bingo card and superimposing the entertainment display on top of it, having a small version of the bingo card somewhere on the screen while the majority of the screen is used for the entertainment display, showing the bingo game card and entertainment display in alternating visual sequences, showing the bingo card then followed by the entire entertainment display sequence then followed by the same bingo card, having two separate displays with one always showing the bingo card and the other used for the entertainment display, etc.

Figure 2:
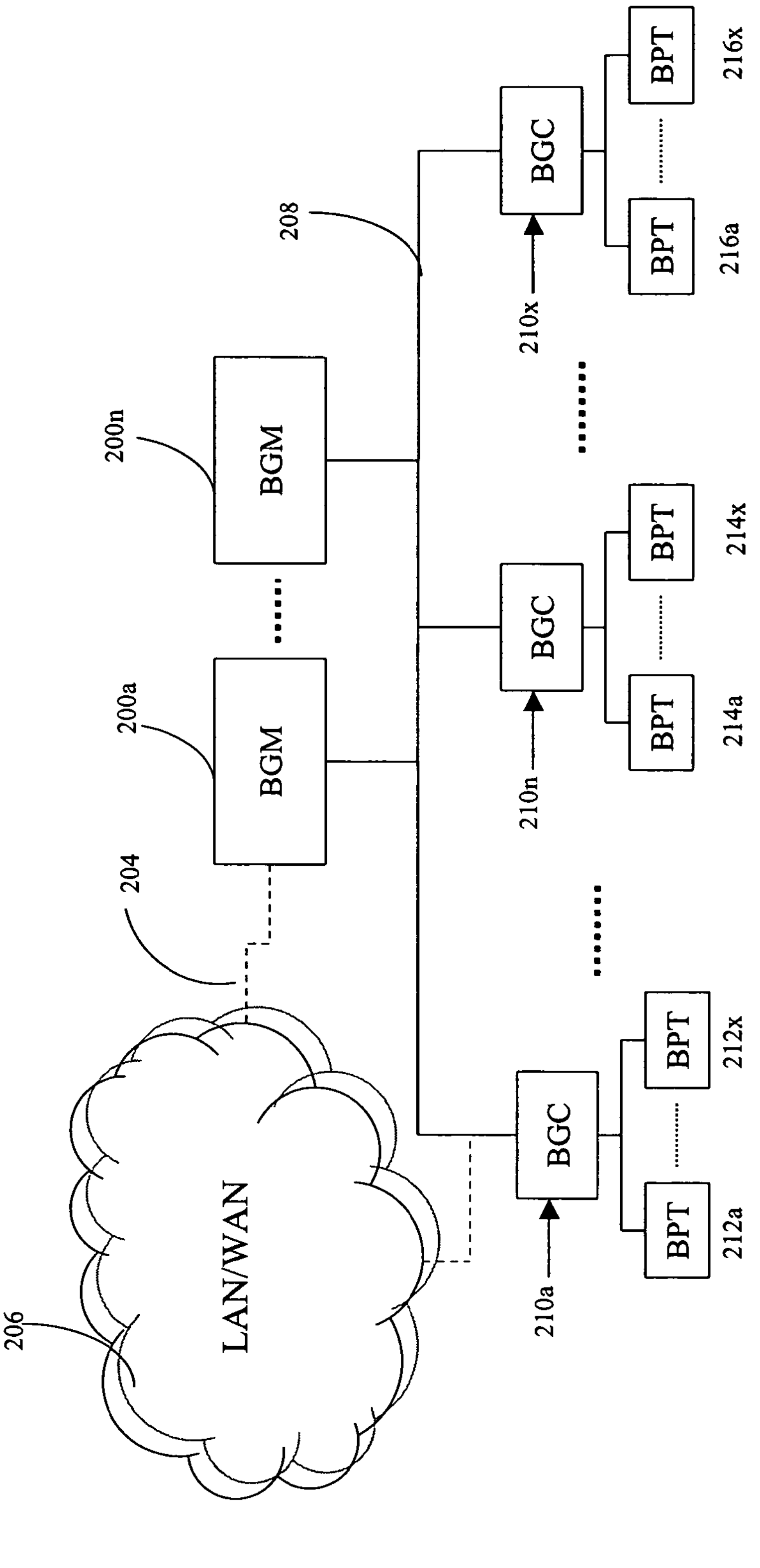
FIG. 2 is an architectural block diagram of a bingo game system in accordance with the present invention.

FIG. 2 is an architectural overview of the primary system components of a bingo game system in accordance with the present invention. Bingo Game Managers (BGMs) 200*a* and 200*n* represent a plurality of BGMs, as indicated by the dots between 200*a* and 200*n*. Both are connected to a network 208 to be able to communicate with the Bingo Game Controllers (BGCs), shown as BGC 210*a*, BGC 210*n*, and BGC 210*x*. Network 208 is expected to be an Ethernet-based network (can be any LAN or other systems interconnection technology, including but not limited to wireless) when installed in a building or reasonably close set of buildings. If the installation spans buildings and is physically disparate, BGMs may be networked to BGCs through any operable combination of LAN/WAN 206 in combination with networked connections 204 using IP addressing or other commercially available networking technologies.

There may be any number of BGCs in general. Each BGC is connected to a set of bingo player terminals (BPTs), typically 16-32 BPTs per BGC, constrained only by the processing power of the BGCs and the networking technology. For small or new installations, the functionality found in the BGMs and BGCs may be combined into one physical computer, which can either be connected to the BPTs via network 208, or still be connected via serial ports to a BGM, with the serial ports being part of the hardware on which the BGM is running. The typical installation may have either separate BGCs and BGMs, or may combine a BGM and the functionality of one or more BGCs in a single physical computer. Further, in very small installations using a single BGM, the BGM, having the functionality of the BGCs, may even be housed inside of a BPT and may share hardware with the BPT.

Shown are three BGCs; 210A, 210*n*, and 210*x*. The dotted lines between each indicate any number may be present. Each BGC is connected to a set of BPTs, shown as 212*a* to 212*x*, 214*a* to 214*x*, and 216*a* to 216*x* respectively. BGCs are designed to locally control the BPTs connected to them, handling protocol conversion and other tasks. In one embodiment each BPT will be connected to a BGC using an RS-485 serial connection with a poll-select protocol, as opposed to the LAN or combination LAN/WAN connection between the BGCs and the BGMs. In another embodiment, Ethernet-based LAN connections will be used between BPTs, BGCs, and BGMs which are co-located in a single facility.

BGCs are comprised of both hardware and software, whose functionality is explained more fully below. The BGC hardware for use with the present invention will be similar in design and construction to the lottery game controllers (LGCs, proprietary to Sierra Design Group, Inc., of Reno, Nev.), also similar to remote game controllers (RGCs). LGCs/RGCs typically have a set of serial ports (e.g., RS-485), a LAN connection (typically Ethernet), a text-only user interface using LCDs or similar display capabilities, and a small user input device, typically a keypad. PC-based LGC configurations may also be used, which are then typically set in a secure housing or in a secure location within the gaming establishment.

All have a programmable microprocessor having volatile and non-volatile memory and an operating system, currently an embedded Unix but further including, in future embodiments, LINUX or Windows NT. The software may be specific to the BGC to handle the needs of the bingo game system of the present invention. "Specific" does not mean wholly unique; rather, it means unique additions or extensions to existing software components, changes to some software components, and no changes to other software components (i.e., low-level drivers or the embedded O.S.). As used in this description, "software" includes firmware and any other code executable by a processor, in addition to an (embedded) OS and application software.

The BPTs will initially use the same hardware as the video player terminals typically seen and used in casinos, normally called "video slot machines" or "video lottery terminals", with new software to enable their use with the present invention. This includes but is not limited to uprights, tombstones, slant tops, and bar top style machines. They will have known internal components typical for a player terminal, including a programmable processor, volatile and non-volatile memory, interfaces to player input devices (buttons, handles, keypads, touch screens, voucher readers, magnetic card slots, etc.) and player output devices (video on screen, audio, lights, voucher writers, etc.), and may have other input/output devices such as IR or RF transceivers, coin hoppers, etc., plus at least one network connection. Due to the nature of bingo, the old-style "pull-handle" found on most upright player terminals will preferably be left off, although that is not a requirement. The software running in the player terminal will be specific for use with the present invention, where "specific" is used in the same way as described above for BGCs and will include unique software packages and modifications to run the bingo game of the present invention.

As more BPTs are put into use, it is expected that unique hardware configurations will be produced and used in addition to the general BPTs described above. This may include hand-held devices specifically designed for use with the present invention, having both wired (plug-in compatibility) and wireless network connections. Any BPT having the needed functionality for use with the system of the present invention is fully contemplated, regardless of physical configuration.

BGMs may initially be implemented as individual computer systems or servers sitting on a backbone network, the network also connected to the BGCs. In some cases the BGMs may be networked directly to the BPTs; this is expected to become the norm as newer systems not having legacy game controllers that need to be kept in use for certain games or progressives are installed. Examples of computer systems usable as a BGM include, but are not limited to, a server system from Compaq™, such as the DL370 series running Windows 2000 Server™ and SQL Server. Alternatively, the BGM may run on hardware using either the QNX or LINUX operating systems with a compatible relational database management system. In installations where the BGM takes over the functionality of the BGC, special I/O hardware (an I/O adapter board and a series of added external serial ports) will typically be required. The software needed to run with the present invention will be installed on an applicable computer used for a BGM, where the hardware and software used will depend on the performance and costing needs of a particular site.

Figure 3:
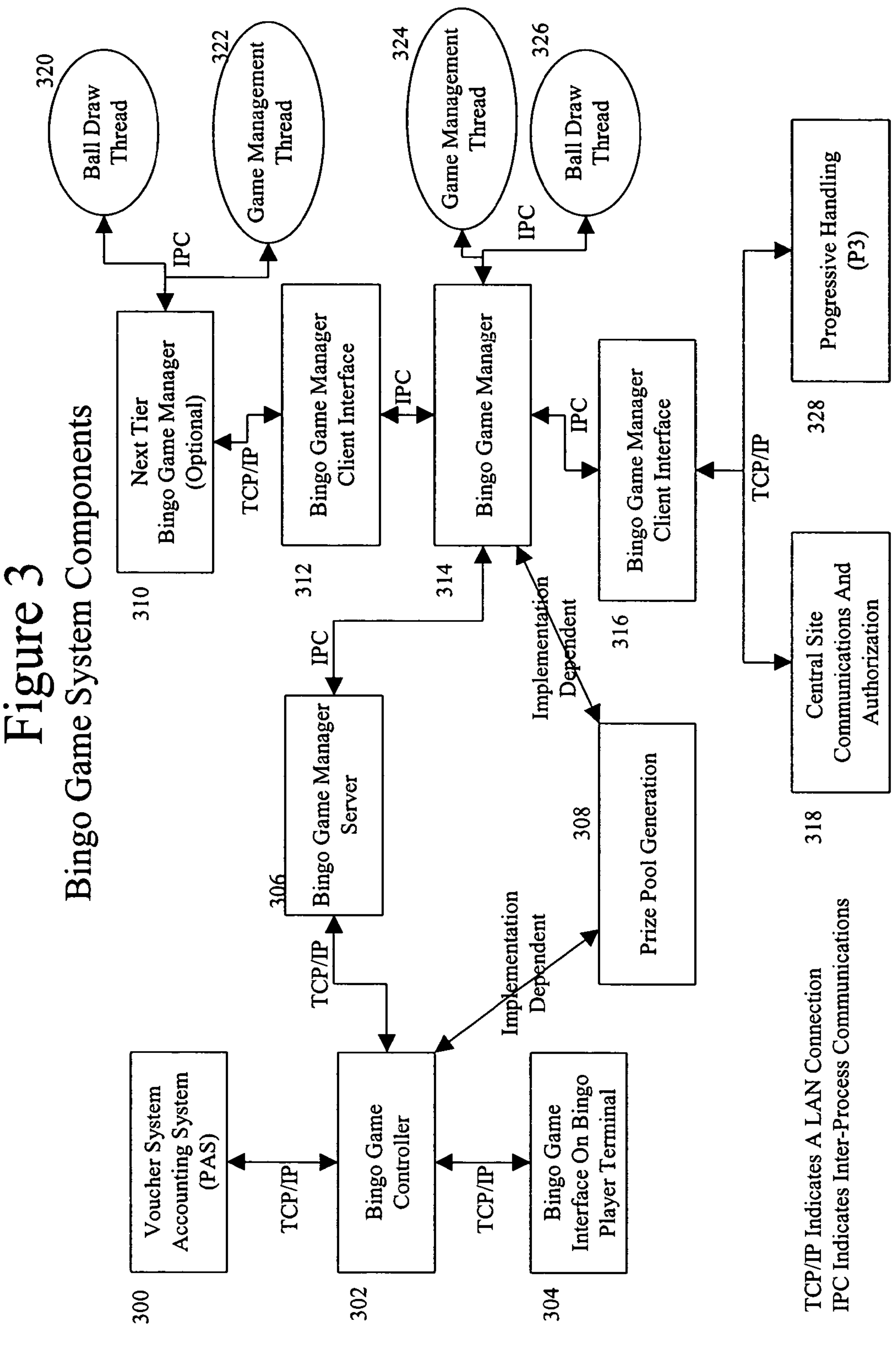
FIG. 3 is a block diagram of major functional components of a bingo game system in accordance with the present invention.

FIG. 3 is a functional block diagram showing the primary components found in the currently implemented system in more detail. BGC 302 provides the primary system interface between BPT 304 and BGM 306, and runs on separate hardware. Communications occur over a network, typically a LAN using Ethernet running TCP/IP (indicated as such next to the logical connection arrows). It also provides an interface to the accounting and voucher systems, PAS 300. BGC 302 software is implemented in C++ using object oriented methodology.

One of the primary functions of BGC 302 is to act as a communications protocol converter between different BPTs and the rest of the system components. For example, in one preferred implementation BGC 302 communicates to a plurality of BPTs using a multi-drop, poll-select protocol over an RS-485 connection. BGC 302 converts other forms of incoming communications protocols into the multi-drop pool-select RS-485 based protocol. Other embodiments of the system may connect BGC 302 to BPTs using either proprietary protocols or industry standards, such as an Ethernet connection using TCP/IP.

To further isolate BGM 306 from variations in BPTs, BGC 302 will typically handle and control specific configuration information for attached games such as denomination and game type.

BGC 302 may also serve as a backup accounting repository. It replicates accounting information kept in connected BPTs to provide system protection against device failures. BGC 302 periodically, or on demand, forwards accounting information to PAS 300. This information includes cash in, number and amount of voucher in, dollars played, dollars won, games played and other, more detailed, information depending on the needs and reporting capabilities of the accounting system. Financial information may be provided in dollars or in equivalent credits. In the event of a BPT failure (or disconnect), BGC 302 has a copy of the most recent financial information and can report that information to the PAS 300.

BGC 302 also has the capacity to recognize inconsistencies in the accounting data received from BPTs and makes required corrections. For instance, if a player terminal has a failure that causes a total loss of data memory, BGC 302 will recognize that event and report to PAS 300 (and other system components as needed by the specific implementation) the last valid financial data it received before beginning a new set of information starting with zero data (BPT reboot). This is important to achieve reliable financial operation. BGC 302 will also buffer information being sent to PAS 300 from BPT 304. This makes the overall system very tolerant of short term failures in networks, or even a temporary failure of PAS 300.

BPT 304 contains the interface to the player for bingo play. It accepts currency, coins, vouchers and other media input to place game credits in a player's account (usually called a "credit meter") which is displayed to a player either as dollars or as "credits" in multiples of a common unit. In the currently preferred implementation, BPT 302 is implemented in C++ using object oriented methodology. It runs under the Linux operating system and has drivers to handle all input-output devices (like currency acceptor, communications, button panel, touch screen, voucher, printer, etc). It further has a graphics package to generate video images and an audio system that generates sounds from industry standard video and sound formats. An application called the Game Manager provides functions which are common to all games and provides a uniform environment for game applications. The game application consists of a bingo engine and entertainment package simulating various familiar casino-style games.

Some specific functions provided by the game applications include: displaying one or more bingo cards for use in playing the bingo game (from a unique bingo card ID received from BGM 314), allowing a function for the player to request change in the bingo card displaying the initial and following elements of a bingo ball draw, issuing "daub" requests to the player, marking the bingo card images with the "daubed" numbers (by highlighting, coloring, blinking, etc.), highlighting a winning bingo pattern, animating the game screen to reflect a casino game result which is the same as the game result received from the bingo game, allowing a player to attempt to cancel a bingo game before the game is finished.

Another function of BGC 302 is to enable a BPT to generate a voucher when a player wants to "cash out". In one preferred implementation, the BPT will use its current financial information about a particular BPT to generate a barcode to be printed in a voucher when the player hits the "cash-out" button.

A further function of BGC 302 is that all initial data is preserved in non-volatile memory so that the state of important or critical game data and financial data will persist through any loss of power, a record of which is sent to the Voucher System 300 if vouchers are being used.

PAS 300 resides above the bingo game system and provides functions that integrate the Bingo Game System into a more comprehensive game system, detail of which is beyond the scope of this document. However, basic functions performed are: acceptance and storage of voucher records, validation of vouchers, collecting and accounting for finite pool usage, collecting accounting information from BGCs for generation of accounting and marketing reports.

Further, the system will gather, log and report on system events which are generated from all system components, including BPTs, BGCs, and BGMs.

PAS 300 currently uses a Microsoft SQL Server database and the Windows 2000 operating system. It communicates with its clients using a TCP/IP protocol and is configured for high availability using a mirrored database and software which is designed to maximize failure recovery.

BGM Server Interface (BGMSI) 306 operates in partnership with BGM 314, providing a client connectivity layer independent of the main application process. It provides handling of client I/O requirements and is configurable to listen on any port for client connections. It runs as an independent process and communicates to the parent process (Bingo Game Manager) using standard inter-process communication (IPC) methods. For performance considerations, there is a preference for IPC methods using shared memory rather than data passing/copying, to avoid the time and memory required for copying.

Prize Pool Generator 308 is used to assure that there is a continuous supply of finite prize pools from which prizes can be drawn for winning bingo plays. It must also keep track of all pools that are opened, used and closed for accounting and reconciliation purposes. It will create initial prize pools and deliver selected subsets on demand for supply to winning bingo plays, and will create new pools as required for non-banked mode.

BGM 314 is the central process that registers participants in a game, conducts the game and determines prize winners. In one preferred embodiment, it assigns the prize results from the appropriate finite prize pools to the bingo game winners. BGM 314 gathers game play requests from participating BPTs, which are first grouped by participation percentage (PP) for non-banked mode operation. Other criteria, depending on the implementation, may also be used including denomination credits played and finite pool type. When a minimum number of participants (varies with the participation percentage, but must be at least two) are ready to play a game, then a ball draw is performed for the game. All 75 balls are drawn for a standard U.S. bingo format (other variants are readily accommodated). BGM 314 executes the play of the games as defined elsewhere in this document. BGM 314 notifies participants of game results by sending them messages (via the BGC). The BGM stores statistics on game play and game results for reporting purposes.

BGM 314 also manages progressive game functionality, passing game contribution information to the P3 progressive subsystem (P3 328) and sending jackpot information to the BPTs. BGM 316 may also be configured to only operate when permission is given from an off-site source.

BGM Client Interface (BGMCI) 312 and 316 provides an independent method to connect and exchange data with a server process, such as P3 328. It handles server I/O requirements and will create and hold connections based on configurable port and network (IP) address. BGMCI runs as an independent process for efficient processing of server I/O and communicates to the parent (BGM) process using standard IPC methods.

Central Site Communications And Authorization (CSCA) 318 is a process that typically resides at a remote site. It provides authorization to operate the gaming devices. It also collects events from remote devices for monitoring purposes. It allows client connections over a TCP/IP network and provides high availability through redundancy and software design practices. It validates clients against a database configuration record before allowing any connection to persist. It stores all data in an RDBMS (relational database management system) and will display received events in a configurable display and database. This facilitates remote control and analysis of the gaming system, greatly contributing to reliability and reduced cost-of-ownership.

Progressive handling process (P3) 318 provides wide area and local area progressive handling for the system. P3 318 collects sales information for participating devices and broadcasts new progressive jackpot information on a configurable interval. In a preferred implementation, each class of game (same denomination, bet amounts and maximum bet) is grouped in a common progressive. The jackpot prize increases by a configurable percentage of the game play, typically one-half to five percent. At a configurable interval a new jackpot amount is broadcast to all participating devices.

In prior art systems a progressive is contributed to by all players (no matter how much is bet in a single game play) but the progressive jackpot can only be won by a player betting at the maximum amount per game play, or, the progressive may be awarded in other ways but is still awarded in its entirety. In the system of the present invention a new method of awarding progressives is disclosed, enabling any player at any bet level to be eligible to win at least a portion of the current progressive jackpot. The method is based on awarding an amount from the current progressive jackpot that is in proportion to the amount wagered, as compared to the maximum bet amount. For example, a class of bingo games may have an allowed bet amount based on a dollar bet (wager). Players may bet one, two or three dollars. A percentage of all play will be contributed to the progressive jackpot. The entire progressive jackpot can be won by a player betting three dollars (three credits), but a player betting one dollar (one credit) can win one third, or a player betting two dollars (two credits) can win two thirds. In this preferred embodiment as the player selects a different bet level, then the prorated (adjusted) jackpot amount for which the player is eligible will be displayed on the BPT.

Further uses of the progressive pool include its use to provide funds for smaller, incremental bonuses during bingo play, including constant payouts (i.e., a particular pattern on a bingo card is a bonus that always pays "x" credits) and progressive payouts (where the payout amount is based in the current amount of funds in the applicable pool, or a portion of a designated pool). The payout rate (spread over time) of these types of bonuses are known, and will be added to the pay-in rate (amount collected from players) such that the payment of these smaller, more regularly occurring bonus amounts will keep the pool at the desired levels. Alternatively, progressive process 318 is readily adaptable to create separate pools for either a set of bonus plays and associated awards or for each type of bonus awards (bonus winning events and their known payouts). These pools will then be used to enable bonus play for bingo players. An example would be "4-corners", a bingo bonus game where any bingo player who fills in (daubs) each of their card's 4 corners within a specified number of balls (i.e., 10 or less, the first 4, etc.) will be awarded-a bonus win amount.

Other capabilities of P3 328 include a reporting package to provide periodic reports on contributions and prizes in the progressive system, and the capability of withholding prize payments over a configurable prize amount until an operator can confirm the win and authorize the payment.

Ball Draw Thread (BDT) 320 and 326 performs ball draws for bingo games in a BGM process. It may be configured to create ball draws at a fixed frequency or on demand. It provides a thread-safe interface to allow the main process to retrieve bingo ball draws as required.

Game Management Thread (GMT) 322 and 324 threads operate in conjunction with a BGM process to manage bingo games states in an independent thread to maximize game speed. It handles game play as required by the main process and provides a thread-safe interface when exchanging data with the main process.

Figure 13:
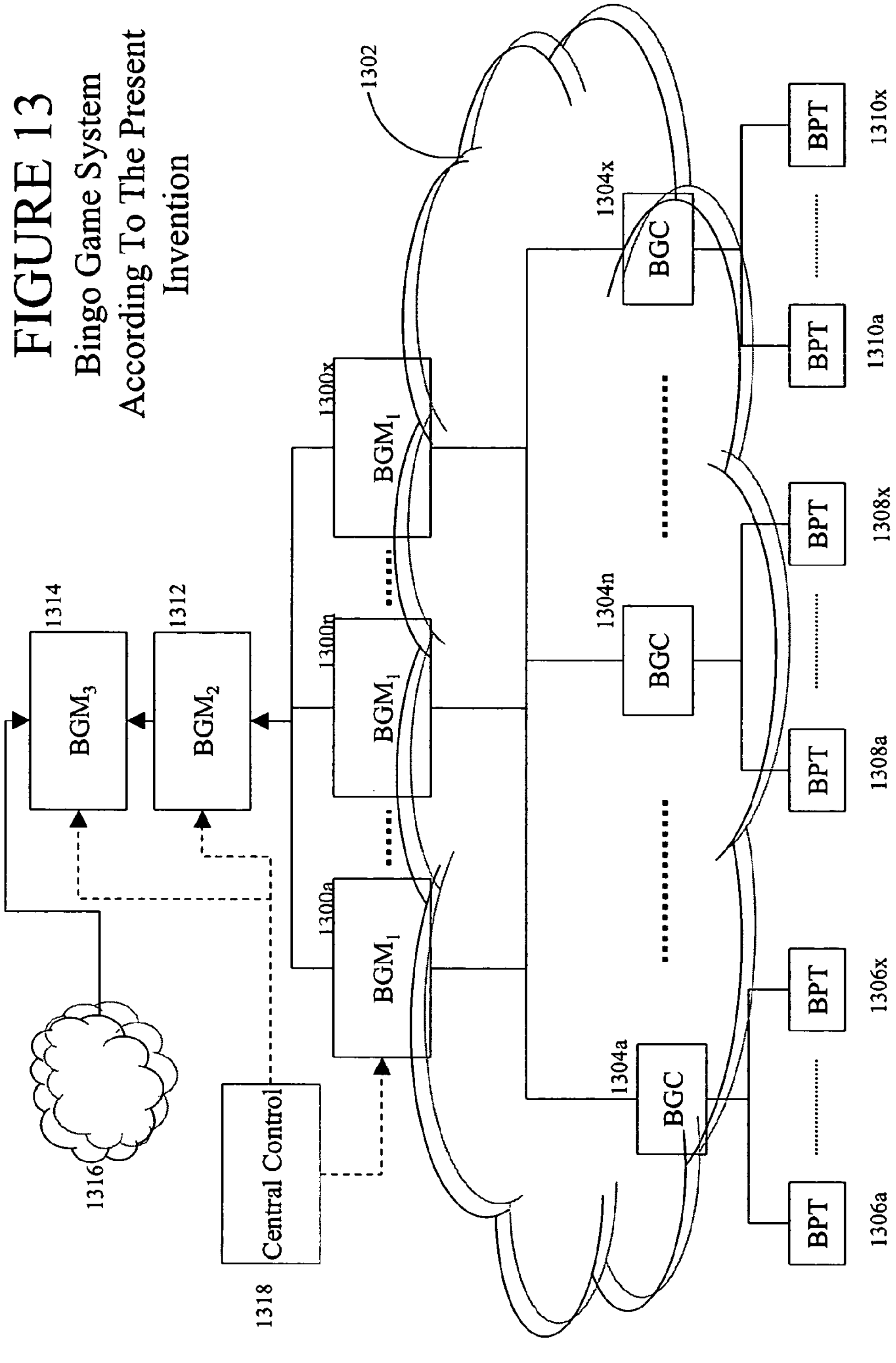
FIG. 13 is a further block diagram of a bingo game system in accordance with the present invention.

Referring now to FIG. 13, one preferred embodiment has BGMs 1300*a*-1300*n*-1300*x* and the BGCs 1306*a*-1306*x*, 1308*a*-1308*x*, and 1310*a*-1310*x* respectively, combined into a single physical machine, with one common physical machine per bank of BPTs (a bank is typically 8 to 32 BPTs). The combined functionality is approximately contained within cloud 1302, which visually represents that the functionality inside the BGCs and BGMs are combined into a single physical machine (per bank). Cloud 1302 graphically represents that the functionality described in the present disclosure can be moved between physical BGCs and physical BGMs over time (depending on how casino and bingo hall infrastructure evolves) while staying within the inventive concepts of the present disclosure (collectively shown as BGMs with subscript 1).

Further, as the amount of computing power has risen significantly in individual machines over the last ten years, it is fully foreseeable that future implementations of the present invention could be implemented with a single hardware platform acting as both one or more BGCs, a level 1 BGM, and a level 2 BGM. It is expected that a level 3 BGM will be at a physically separate location; however, if a level 3 BGM is at an active casino location also having level 1 and level 2 BGMs, then the single hardware platform could also include a level 3 BGM (or more). Standard software control and optimization techniques could be used, including multiple processes having multiple threads using shared libraries, etc., preferably in an object oriented programming environment, so as to effectuate the functionality currently being described as implemented in a plurality of physical machines in a robust, reliable, and functionally proficient manner.

Briefly switching to FIG. 13, when such an implementation is created, the networking functionality shown in FIG. 13 and similar illustrations will be understood as any operable form of communications between components in a single physical machine, including but not limited to standard inter-process communication (IPC) message handling, machine-internal hardware communications such as those between multiple-CPU architectures, shared data and program state memory locations used by threads in a process, etc., as needed to communicate between logical components. In such cases "bingo game system" will mean the functionality described herein but embodied in a physically different, more compact machine configuration.

As individual game platforms start using standard LAN (preferably Ethernet) connections rather than the older serial port connections, the network infrastructure in newer installations will look like a common network connecting all the nodes in FIG. 13. That is, all the BPTs and BGMs (it is expected that physically separate BGCs would not be needed) will be nodes on a common network. The logical relationships between BPTs and BGMs (including levels of BGMs) will still be applicable.

In one preferred embodiment, game requests coming in from a bank of BPTs (e.g., 1306*a*-1306*x*) will be formed into a session on periodic intervals, preferably less than 1 second when the casino or bingo hall is reasonably busy. In this preferred embodiment, the games are software objects that become instantiated using data from individual game requests from the BPTs; one game object per wagering level. Upon the occurrence of a specified event or a time interval, the game object will no longer be loaded with data from requests; that game is now closed. Another game object at that betting level will be opened when the previous game object is closed, enabling enrollment for the next game and session. This allows a constant flow of games so that players will rarely have to wait very long for a game to start. This encourages game play by players, maximizing the attractiveness of the bingo game system.

If there are not enough players to form a game, the data associated with each play request (not the entire game object) is forwarded to casino-level $BGM_2$ 1312, which collects similar data from all bank-level $BGM_1$s in the casino. Casino-wide or bingo-hall-wide $BGM_2$ 1312 then forms a game by enrolling players located throughout the casino. Like the first level $BGM_1$s, a preferred embodiment will carry this out by instantiating a game object using data from game enrollment requests. Optionally, if there are not enough players to form a game in a casino there will be one more level of BGM, $BGM_3$ 1314 which accepts game requests from this casino/bingo-hall as well as one or more other casinos/bingo-halls, generally indicated by cloud 1316. Note that the connections between $BGM_1$s and $BGM_2$s are expected to be via a LAN (such as Ethernet), while the connection between $BGM_2$s and $BGM_3$s is expected to be a combination of LAN/WAN connectivity, including commercial internet-based (WWW) connection interfaces between some remote locations for some casinos or bingo halls. Which BGMs fill which role in the BGM hierarchy will be a settable parameter on BGM system startup, for each BGM.

The arrows on the network interconnections between $BGM_1$s, $BGM_2$s, $BGM_3$s and players in different physical facilities 1316 are only intended to show the direction of game requests in circumstances when more players are needed for a game. Clearly, network traffic will continually flow in both directions. Using three levels of BGMs is currently the best known method for implementing the bingo game system of the present invention across a plurality of physical properties or a plurality of installations. Level 1 BGMs play games at a bank level, and when the property is busy rarely go to level 2 BGMs. Note that this reduces any issues with casino-wide network traffic. Level 2 BGMs are invoked when play is slow in portions of a single installation (requiring game play across banks), so overall network traffic in the casino or bingo hall will be generally less at the same time. Level 3 BGMs are invoked when entire properties or installations are slow. This corresponds to situations when the overall network traffic load in a particular facility or installation is also very low, so playing bingo games over a broad area will meet with responsive networks. The three tiers of BGMs make best use of available network conditions while providing bingo games across banks and multiple properties and/or installations as needed. As experience with the system develops, other configurations of BGMs may become evident; all such configurations are within the inventive concepts of the present invention.

FIG. 13 further shows Central Control (CC) 1318, connected with dotted lines to BGMs. The dotted lines represent any LAN/WAN combination or any other operable means to operably connect systems over an extended distance. CC 1318 is a system which, without periodic communications between it and the system having the BGMs, will cause a system-wide functional shutdown. This will typically be in the form of not allowing players to play bingo games (setting a flag that prevents enrollment in an appropriately secure manner), although other forms of shutdown may be used, including a forced system-wide shutdown of all BGMs (may also include shutdowns or disablement of play on BPTs and/or BGCs). CC 1318 will typically be connected to a plurality of installations, where each installation is unrelated except they are running a particular vendor's equipment and/or software packages.

The communications between CC 1318 and each installation may encompass other data and functionality, as well as the base control mode, the base control mode being that CC 1318 and the systems of the installation must be in communications in order to be enabled to run. Examples of other communications would include running a progressive from CC 1318 shared between otherwise separate installations. This enables small bingo halls to compete with large bingo halls for progressive jackpot growth and size. Other data includes individual machine (BGM, BPT, BGC) error logs, remote troubleshooting, and the running of accounting packages in CC 1318 (typically for smaller Bingo Halls that cannot support a separate PAS).

One primary task is, however, that if CC 1318 and the installation go out of communications, bingo players will not be able to play bingo at the installation. In addition, there may be a need to have a forced shutdown, i.e., CC 1318 will have the ability to send a "cease operations" command message to the installation, which will have the same effect as if CC 1318 and the installation are out of communications. Shown is one preferred embodiment where CC 1318 is in communications with each BGM; other embodiments having equivalent functionality are equally preferable.

There are methods that will come to the mind of a person having skill in the systems communications and control arts and having the benefit of the present disclosure for causing a stop in bingo game operations if communications between CC 1318 and any installation are down for a specified amount of time. One is to use a "heartbeat" signal between each BGM and CC 1318; another would be to have two levels of heartbeat, one between CC 1318 and a designated BGM at an installation, and secondary heartbeats between the designated BGM and other machines at the installation. If CC 1318 cannot communicate with the designated BGM, that BGM will (i) not enroll players itself, and will (ii) stop responding to heartbeat signals from other installation machines, causing them to stop enrolling players. Another method is to have a specially encoded and encrypted message exchange between CC 1318 and either each BGM or a specifically designated BGM at an installation at predesignated intervals (i.e., every 48 hours). It the exchange does not occur, the BGM will cause a cease operations. Any such method having the effect of enabling a central system, shown as CC 1318, to cause a halt in game operations at a particular installation will work with the system of the present invention.

Figure 4:
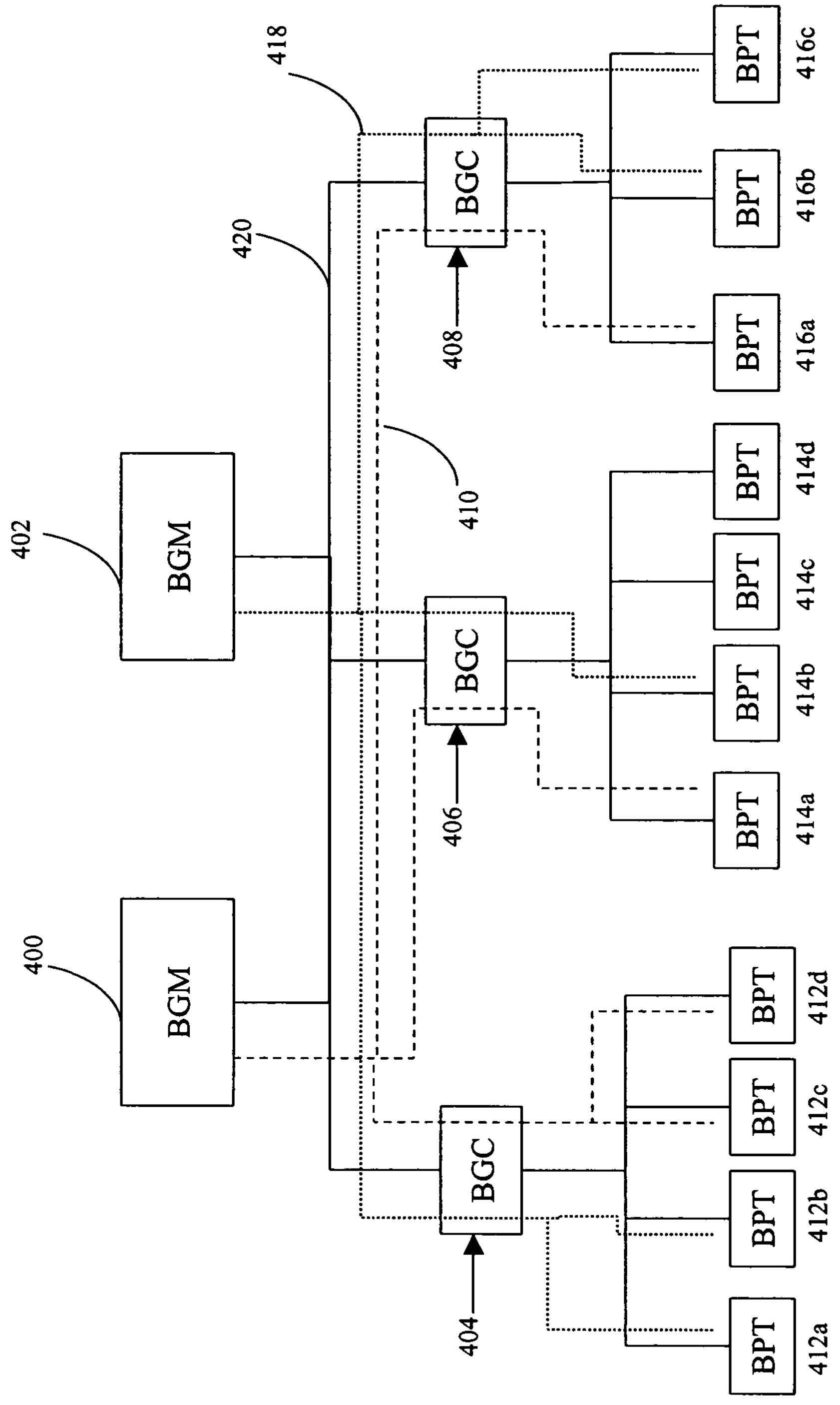
FIG. 4 is a block diagram showing multiple bingo games and sessions in accordance with the present invention.

Continuing now with FIG. 4, shown is a simplified bingo game system according to the present invention having 2 BGMs (400, 402), 3 BGCs (404, 406, 408), and 11 BPTs (412*a*-412*d*, 414*a*-414*d*, 416*a*-416*c*). This (and FIG. 5) show simplified systems in order to illustrate the concept of bingo sessions and bingo games. BGMs 400 and 402 are connected to each other and to each of BGCs 404, 406, and 408 through network connection 420. Each BGC is networked to its set of BPTs. As discussed above, BPTs communicate with the BGC to which it is attached (not to other BPTs), typically over multi-drop serial connections. A preferred embodiment will have each BGC talking to any and all BGMs in the system, but not directly to each other, to enable control of the games being played, the prize pools, and similar resources. Note that in systems where BPTs are connected using a LAN-based technology such as Ethernet directly to BGMs (no intervening BGCs, or where the functionality of BGCs and BGMs are combined into single physical boxes and applications), the individual BPTs will still not communicate directly with each other, but BGMs will be able to communication with each other as needed.

BGM 400 is running a game session between the BPTs shown with logical dashed lines 410; BGM 402 is, in parallel, running a game session between the BPTs shown logically connected via dotted lines 418. Note that there is no requirement for a game session or individual games within a game session to be run from a single BGC; the BGM will logically connect a set of BPTs into a game session and games across BGCs. This enables the bingo game system to enroll players from anywhere on the network into a common game session and individual games.

Figure 5:
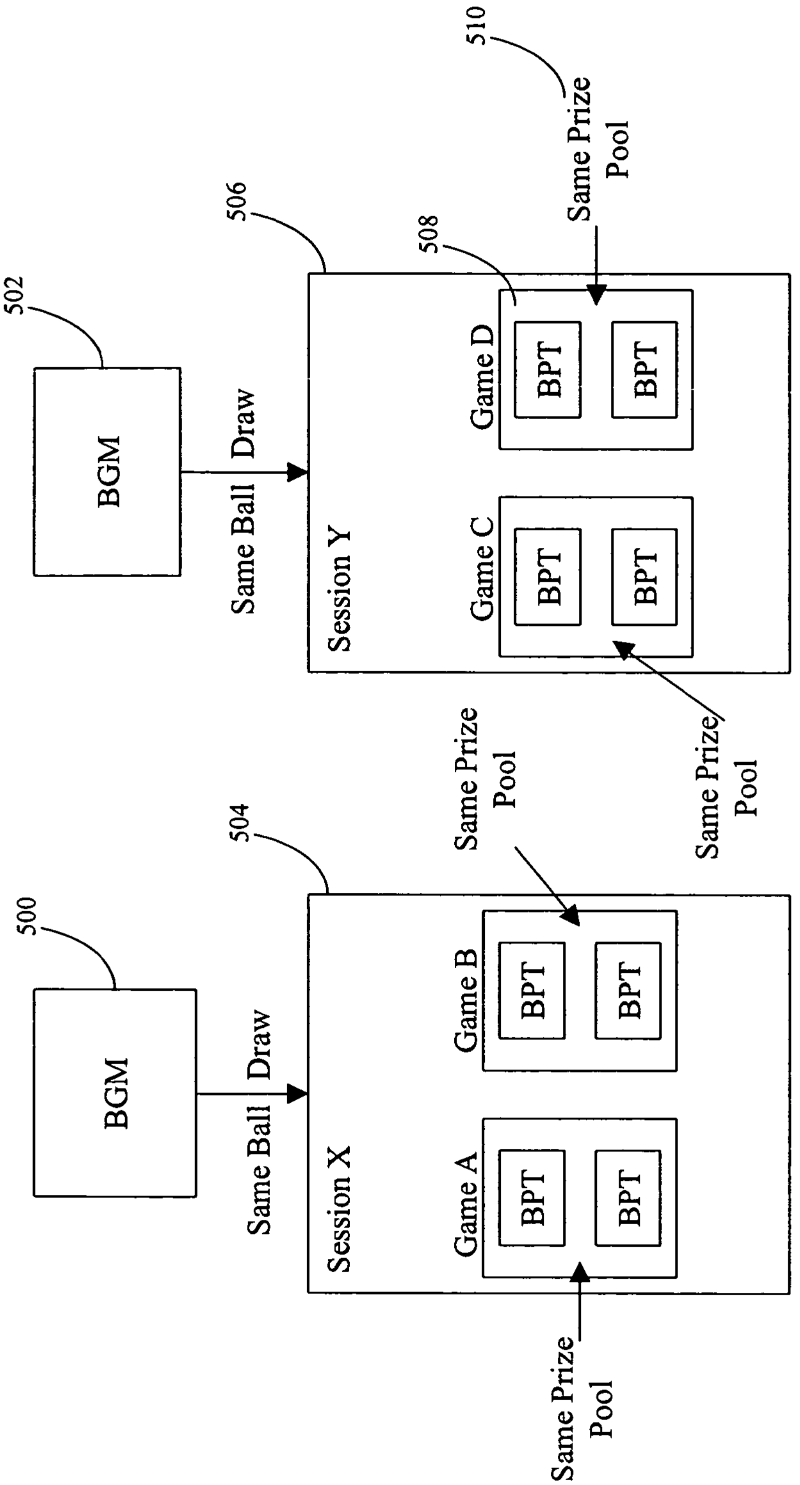
FIG. 5 is a logical block diagram further showing the relationships between bingo games, sessions, and bingo game managers in accordance with the present invention.

FIG. 5 shows a bingo game system having two BGMs 500 and 502, 3 BGCs (not shown) and 8 in-use BPTs (inside session boxes 504 and 506) in the same logical configuration as was shown in FIG. 5. When looked at from the viewpoint of logical connections, the conceptual picture becomes clearer. The BGMs control the sessions and games once they are started, with the BGCs acting primarily as protocol translators and pass-through devices (thus, BGCs are not shown). Within each session there may be a plurality of games, shown as Game A through Game D, Game D having label 508. Game A and Game B are being played within Session X (504), while Game C and Game D are being played with Session Y (506). Session X having games A and B is being run by BGM 500, and Session Y having games C and D is being run by BGM 502.

A game session is one or more individual games run by a BGM. The BGM carries out a ball draw which will be used by each game in a game session. It is the use of a common ball draw (necessarily from the same BGM) that characterizes the games in a session: by definition all games in a session will use the same ball draw.

In the most general sense a game is defined as at least two players (some bingo games will require a higher minimum number of players) with no upper limit other than the availability of BPTs, all competing at the same betting/wagering level (NOTE: this is describing non-banked mode; banked mode is described below). Thus, the two players using the two BPTs shown enclosed in the box labeled Game A will be betting at the same level (same number of credits or cost per game, credits or cost per card, or other betting quantifier), and the two players playing the BPTs shown enclosed in the box labeled Game B will be betting at the same level. Game A and Game B will be different betting levels, otherwise they would be playing a single game involving four BPTs.

For the purposes of this disclosure, wager level, wagering level, and betting level all refer to the basic unit of cost a player pays to play a single bingo game. This will typically be what a player pays, in cash or game credits, for a single bingo card but other purchasing units may be used. A wager amount may be any amount related to or based on a wager level (e.g., a multiple of the base wager level, a wager amount to be split amongst several bingo cards having a wager level, etc.). Note that a player may be playing at more than one wagering level by purchasing multiple bingo cards for use at the same time, having wagered a different amount (paid a different amount) for different bingo cards shown on the BPT simultaneously. From the player's perspective, the differently wagered bingo cards will be "one game" and may well all use one ball draw. Note, however, that this perspective and use of the words "bingo game" or "game" is not the same as the meaning of the words from the bingo system's perspective, where a game is defined to be a set of enrolled cards having the same wagering level (typically the wagering level is same cost per card, but other wagering units, e.g. the same cost per ball or same cost per bank of cards, are fully contemplated herein).

Game A and Game B were designated by BGM 500 as comprising a single session, shown as session X. Game A and Game B will use the same ball draw. Likewise, BGM 702 is running Session Y, Session Y having Game C and Game D. Game C and Game D will use a single ball draw generated by BGM 502, which will be different than the ball draw used in Session X. Note that although Game A and Game B must be at different betting levels and Game C and Game D must also be at different betting levels, it will be normal for any game in one session to have the same betting levels as a game in a different session. Thus, Game A and Game D may be at the same betting level. The reason for this will become clearer as the session generation process is described more fully below.

Finally, the designation "Same Prize Pool" 510 is used with each game. The use of the same bingo prize pool (or same set of pools) is a defining characteristic of each game. Bingo prize pools are a set of prizes that have been calculated to yield a specific over all pay-out amount upon being exhausted, at each betting level.

Thus, a bingo session is functionally characterized as a set of games using the same ball draw, and a bingo game is characterized as the set of enrolled players in a bingo session using the same prize pool or prize pools to from a game. Note: there must be at least two players, and sometimes more depending on the specific implementation, to begin a bingo game.

Bingo prizes for each game are paid out of a pool of predetermined or pre-selected prizes (or winning amounts). These pools are finite, predetermined sets of prizes that are generated and used to assure that the games being played are non-banked for use in non-banked mode. This is accomplished using pools because when a pool is exhausted through use in bingo games, it is always the case that the amount wagered, the amount given out as prizes, and the amount kept by the bingo parlor are fixed. The pools further enable variety in the games being played, enhance the attractiveness of the games to the players due to the choices, and enable a new method for mapping bingo game results to entertainment displays that mimic complex slot machine type games.

Figure 6:
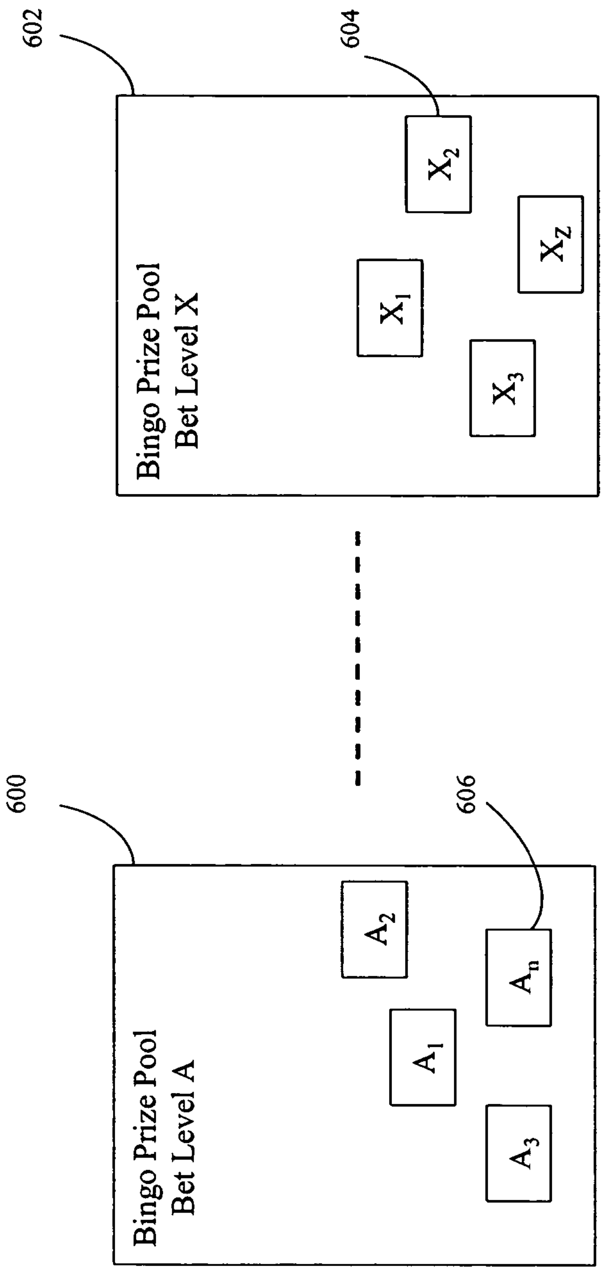
FIG. 6 is a block diagram showing prize pools in accordance with the present invention.

FIG. 6 shows a conceptual diagram of bingo prize pools. Shown are two bingo prize pools, bingo prize pool 600 and bingo prize pool 602. Note that bingo prize pool 602 has the internal designation of "Bingo Prize Pool Bet Level X", indicating that there may be as many bingo prize pools as there are betting levels between Prize Pool A and Prize Pool X. Also, there are expected to be a plurality of bingo prize pools at each betting level. Each pool contains individual prize elements, shown in bingo prize pool 600 as prize elements $A_1$ through $A_n$, where the designation $A_n$ means there may be any number of prize elements as needed to meet the mathematical requirements for the pool. Bingo prize pool 602, at bet level X, shows elements $X_1$ through $X_z$, where $X_z$ indicates there may be as many prize pool elements as needed to meet the mathematical requirements for this pool. Further, the dashed line between pool 600 and pool 602 indicates there may be as many pools as betting levels (as well as more than one pool per betting level).

Figure 7:
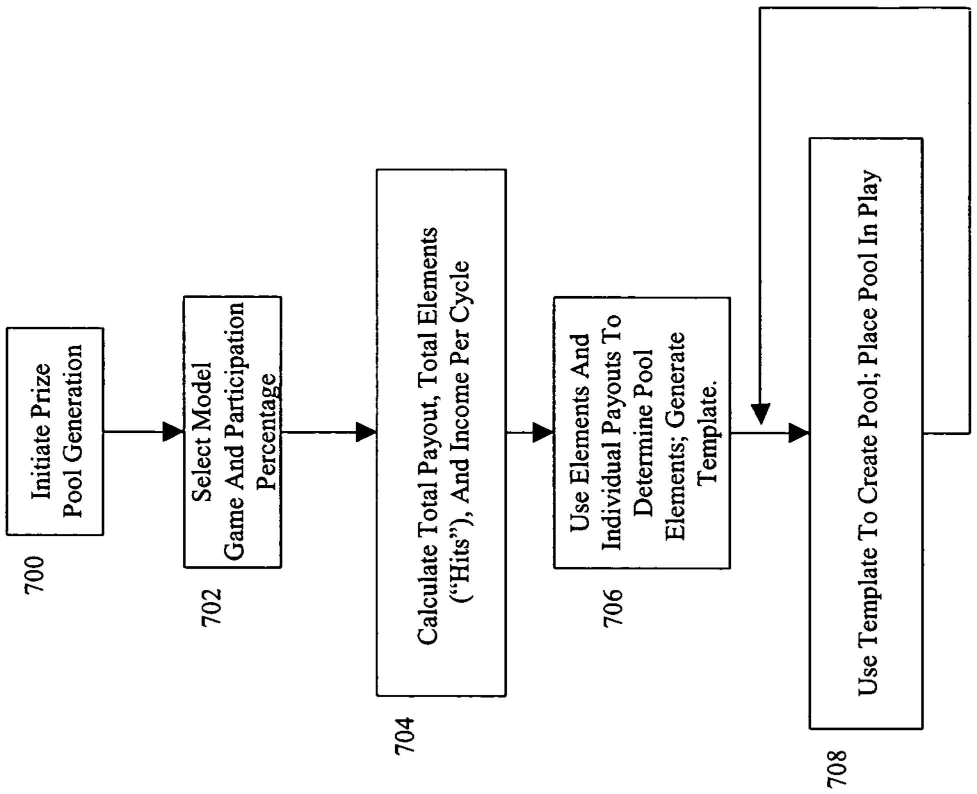
FIG. 7 is a flow diagram of bingo prize pool generation in accordance with the present invention.

FIG. 7 outlines prize pool generation. Starting at box 700, the activities to start or initiate a prize pool are carried out. This will typically be at system startup. Box 702 is left for box 704.

The actions corresponding to diamond 702 are those associated with selecting a model game and a participation percentage. A model game refers to the slot game or other game of chance that the bingo game is mimicking during the entertainment portion of game play, and the participation percentage is the number of players, typically expressed as a fraction, who are to win prizes during a bingo game (must always be at least one, so there is at least one prize the players are competing for). Thus, a ½ or one out of two participation percentage means, on average, 50% of the players playing this bingo game will win some kind of prize. This is explained more fully below, but note that any participation percentage may be chosen (e.g., ¼ or 25%, ⅓ or 33%, etc.). Further, in the preferred embodiment algorithms are provided in the BGM to achieve other participation percentages, on average, by varying the participation percentage between individual games based on past results. For example, a 50% participation percentage can be achieved in games with three participants by having them enrolled in bingo games that alternate between one and two prizes, so that for every six bingo game enrollees three prizes are distributed from the pool. By having a pool of finite prizes in combination with a known percentage of winners, the total percentage of revenue that is given out (in the form of prizes) can be controlled and varied with great flexibility, so that it makes it feasible to create a broad array of prize awards to implement realistic entertainment simulations while keeping a known operator hold.

A prize can, in the present invention, be less than the cost of entry. For instance, a game play may cost 10 credits (where a credit is equivalent to a known amount, such as $0.25) and the prizes can have any value. This is important because it allows great variety in prize structures and specifically enables prize structures which enable simulation of paytables for the popular casino-style slot games. As an example consider a game with a 50% participation percentage. If the cost of entry in the game is 10 credits a prize structure could be created as follows:

| Prize Value | Number In Finite Pool |
|---|---|
| 1 | 758 |
| 2 | 200 |
| 5 | 40 |
| 10 | 20 |
| 100 | 2 |

This table has 1000 prizes which have a total prize value of 1758 credits. If 2000 players play one card in this game for 1 credit, then the total revenue will be 2000 credits. With a PP of 50%, 1000 will win prizes. If the prizes are selected from the example finite pool then the total value of those prizes will be 1,758 which is 87.9% of the total revenue.

If a reel game (or any other game having a payout table) is not used, a standard prize distribution may be used instead. Using a standard distribution curve around a center award amount (typically equal to the betting amount), prizes are selected by picking points (typically in an evenly distanced manner) along the x-axis, using the y-intercept on the distribution curve for payout amounts, with the number of points along the x-axis being equal to the number of prize elements in the bingo prize pool being generated. Finally, to get the desired overall payout amount, individual elements can be added or removed with the total payout being recalculated until the desired payout rate is achieved.

The above paragraph is one example of a non-paytable-based prize pool generation method; other methods meeting the mathematical requirements for a particular bingo prize pool will readily come to the mind of a person skilled in this art and having the benefit of the present disclosure. For example, it may be the case that some prize pool implementations may make use of zero-value prize pool elements, in which case total payout calculations would be made on the basis of the pool elements alone (including the zero-value elements), and where the set of elements picked for use with each bingo game would use an algorithm that would include a check for either a certain percentage or specified minimal number of non-zero elements in the set. It is currently believed the pool construction and element choice algorithms explained in detail in this disclosure are the best ones for the bingo gaming system; however, as the system continues to evolve and experience is gained with systems embodying the present invention around the country, it may become apparent in the future that other bingo prize pool generation and/or element picking algorithms are useable and perhaps even become preferable. All such variations are within the inventive scope of the present disclosure.

If a casino or bingo hall decides to make use of entertainment screens (expected to be the vast majority of installations), attention is returned to box 702, proceeding to box 704. The actions corresponding to box 704 include calculating a total payout, the total number of hits in a complete cycle, and the gross income from a cycle of play. These are done using figures derived from tables such as Table 8A in FIG. 8 (or the above-discussed distribution curve when no paytable is being used). The calculations will be shown in more detail below. Box 704 is left and box 706 entered. Here the elements of a pool are generated using the number of hits with their individual payout amounts. This data is used to generate an element set, which can also be stored in machine readable form as a pool template. Using the pool template allows a pool to be generated any time and with very few compute cycles. Box 708 is now entered, corresponding to the actions of using the stored template to duplicate (make) a pool having the desired properties, and making the pool just created available for use. Note that the flow arrow out of box 708 returns to box 708. This arrow corresponds to the fact that once a template has been created, each time a new pool is needed it is simply generated using the existing template. The actions corresponding to boxes 700 through 706 need not be repeated unless and until the system is restarted, or a new wager level, different PP, or new mimicked game using a new payout table is introduced into the bingo game system.

One embodiment will use two pools per wagering level per BGM, where one pool (per wagering level) is active and the other is a backup pool (for the same wagering level). When the active pool is exhausted, the back-up pool becomes the active pool, which also triggers a pool-generation request. This newly generated pool will then be designated as the next backup pool. Using an active pool and a backup pool allows seamless operation of sessions.

In another preferred embodiment, the backup pool (now called a secondary pool) is created and put into use when a predetermined percentage of primary pool elements remains. Prize elements can then be drawn from both pools until the primary pool is exhausted. In a further preferred embodiment multiple pools (more than two) are active, where an iteration of a pool is created upon a percentage depletion of a preceding iteration. For example a secondary pool can be created when a primary pool is 50% depleted, and a third pool can be created when the second is 50% depleted, and so on. Any percentage may be used and prizes are selected from multiple active pools using round-robin or other selection algorithms, where the minimal requirement is that prizes are selected from all active pools (per wager level).

FIG. 8 shows two example tables, table 8A and table 8B. Table 8B is what a player sees when playing an actual reel game, and is expected to be shown to a player on the entertainment screen when mimicking the reel game. It may be printed on the game machine glass or similarly posted as well. "Coin Inserted" will be the column corresponding to how much the player bet on the bingo game, and will preferably be highlighted for the player. Table 8B does not contain enough information on the game to derive the elements in a prize pool. To generate a prize pool, the information in Table 8A is needed. Table 8A will be used as an example of how to derive prize pool elements.

First, since this is for a 32 stop/reel, 1 payline game machine, one "cycle" is 32768 plays, where a "cycle" is the total number of reel/symbol combinations on all paylines possible on a machine. In this case, the total number of possible combinations using a single payline with 3 reels and 32 stops/reel is equal to $32^3$ for evenly weighted reels.

From Table 8A, the total number of hits is 6518. "Hits" means any reel and symbol combination that pays out any amount. The total payout for the 6518 hits is 30985 units (may be any monetary, credit, or award unit). Thus, for this game we have the following:

Cycle=32768

Hits=6518

Pays (Total Payout Value)=30985

From which the games payout percentage can be calculated:

Pay Out Percentage=(30985/32768)×100=94.56%

Using this information to generate the bingo prize pool that has the "feel" of the mimicked game for reel spins and payouts, the following bingo game pool equivalences are made.

Total Payout Value=Bingo Pool Payout Value=30985

Total Hits=Number of Bingo Pool Elements=6518

Thus, each bingo prize pool for a bingo game using this reel game in its entertainment display will have 6518 non-zero elements with a total value of 30,985 units. The element values assigned to each element will be taken from the Table 8A. There will be 8 elements having a value of 1200 units, 27 elements having a value of 90 units, 64 elements having a value of 60 units, and so on down through the entire table.

Now the base participation percentage is calculated. Since it is always the case that the pool's gross income (total money paid to play out the pool) must be larger than the total payout value (30985), it is known that whatever participation percentage is chosen, it must yield a number of plays (to exhaust each pool) larger than 30985, assuming a cost of one unit to play a bingo card (different costing would produce different results, i.e., if each bingo card costs 2 units, the number of bingo card sold per pool would be halved). Example calculations are given below.

Assume a 1 out of 2, or ½, Participation Percentage:

Game-Plays per Pool Would Be

6518/0.5=13036 Game-Plays1Pool

Pool Gross Income=13036 Units

½ Participation Percentage Doesn't Work

Assume a 1 out of 3, or ⅓, Participation Percentage:

Game Plays per Pool Would Be

6518/0.33=19544 Game-Plays1Pool

Pool Gross Income=19544 Units

⅓ Participation Percentage Doesn't Work

Assume a 1 out of 4, or ¼, Participation Percentage:

Game Plays per Pool Would Be

6518/0.25=26072

Pool Gross Income=26072 Units

¼ Participation Percentage Doesn't Work.

Assume a 1 out of 5 Participation Percentage:

Game Plays Per Pool Would Be:

6518/0.2=32590

Pool Gross Income=32590 Units

⅕ Participation Percentage Works

A ⅕ participation percentage will have a payout rate of (30985/32950)*100~=94.04%, very close to the game being mimicked. In addition, the prize pool elements are selected randomly from the prize pool when awarded to players, so the win distribution seen by players will truly mimic the actual reel game in both event distribution and reel/symbol winning combinations.

As will be clear to persons having skill in this art coupled with the benefit of the present disclosure, a series of variables may be used to generate desired combinations of participation percentages, card or game play costs, base units, etc., to make use of the present invention as desired by a casino or bingo hall operator. For example, if the base prize unit is $0.01 (penny) and a bingo card wager (cost of a bingo card per play) is $0.05 (nickel), then a participation percentage of ½ may be used:

Assume a 1 out of 2, or ½, Participation Percentage with a cost of 5 units per game play:

Game-Plays per Pool Would Be

6518/0.5=13036 Game-Plays/Pool

Pool Gross Income=65180 Units

½ Participation Percentage charging 5 units per game play works.

The total payout rate at ~=47% is much lower than the ⅕ participation percentage using a single unit charge per game play.

Assume a 1 out of 2, or ½, Participation Percentage with a cost of 3 units per game play:

Game-Plays Per Pool Would Be:

6518/0.5=13036 Game-Plays/Pool

Pool Gross Income=39108 Units

½ Participation Percentage charging 3 units per game play works.

The total payout rate is ~=79%, which would typically be more acceptable to regular players than the ~=47% payout of the previous example. Different combinations of participation percentages, unit charges per play, mimicked reel games, paytables, as well as other variables can be used to arrive at the optimal set of choices using the bingo award pools of the present invention for the operator of each bingo hall or casino.

Note that the use of pools has completely eliminated the need to map each winning line of the reel game's outcomes into a particular bingo card configuration, as was done within the prior art. This has made it possible to use very complex payout models such as 5-reel, 9-payline reel games in the entertainment portion of the display while keeping the look-and-feel of the game being mimicked. Since the actual game's winning symbol and payline combinations are used to generate the elements in a prize pool, it will always be the case the any prize won by a player playing bingo will have a corresponding display for the entertainment portion of the game immediately available and quickly generated (unlike the prior art methods of generating a correspondence between bingo card results and the game being mimicked).

Additionally, using elements generated with the original game's paylines and symbol combinations means that the original game display mappings may be used. Put differently, it will always be the case that for each element in the pool, there will be at least one reel and payline combination to show a player (when there is a plurality of paylines and symbols showing a result, one display may be picked using a random choice between the equivalent displays), and that display can use the original game's mappings. Not only does the presented method enable the mimicking of highly complex reel games in entertainment displays with bingo games, it preserves their look and feel and further provides a straightforward method for reverse mapping winning bingo outcomes to reel displays. This same method is further used to generate bonus win amounts (the amount to be awarded a player upon the occurrence of a specified bingo pattern, the amount to be given calculated in accordance with the game to be modeled as are the pool elements), and, when won by a player, is shown in an entertainment display using the same game's reverse mapping.

As stated earlier, once a pool for a specific game at the designated wager level has been developed the calculations described above need not be carried out again each time a pool is needed. Rather, the pool with the needed characteristics can simply be duplicated. In a preferred embodiment the initial pool is called a template and is never used; it is replicated and the replicant used for game play. This makes the creation of pools extremely fast, using few compute cycles. This process is intended to be automated (a program running on a BGM), and is expected to be available on each BGM. Note, however, this is not a requirement. A bingo prize pool initialization program with an easy-to-use graphical user interface may be running on a single BGM or other computer; after a pool template is initially created it may be sent (electronically) to each BGM supporting wagering at the level for which the prize pool was initialized. After that, new bingo prize pools are generated by replicating the template. Thus, the initial generation of a bingo prize pool may be done on one particular BGM (or even at the manufacturer's facilities or other off-site location) rather than on every BGM at a site. The prize pool is then replicated on each active BGM.

A typical user interface to make initial generation of bingo prize pools easy may involve a casino or bingo hall picking the game to be mimicked from a list, selecting wagering levels, selecting the number of units needed to buy a bingo card, and the BGM will display corresponding participation percentages. The operator will then pick a participation percentage, with the BGM then creating a first pool (a mathematical description thereof). Every pool needed after this initialization process will simply be a copy of the original pool. Note that the pool elements are not ordered (the pool elements are not issued in an order related to pool generation), so there is no problem with this type of pool duplication causing visible repeating patterns detectable by players.

In one embodiment, all pool templates will be generated off-site at a manufacturing or other facility and transported or transmitted to the game site, thus insulating the operators of bingo halls or casinos from the complexity of the pool template creation process.

The example of pool generation used above was for a reel game. The method, however, can be used for any game of chance. Shown next as an example where the entertainment display will mimic a poker game.

POKER EXAMPLE

| Pay Table | | Combinations and Payouts | |
|---|---|---|---|
| | | Combos | Total Pay Out |
| Single Pair, J+ | 1 | 422,400 | 422,400 |
| 2 Pair | 2 | 123,552 | 247,104 |
| 3 | 3 | 54,912 | 164,736 |
| Straight | 4 | 10,200 | 40,800 |
| Flush | 5 | 5,108 | 25,540 |
| Full House | 8 | 3,744 | 29,952 |
| 4 5-K | 25 | 432 | 10,800 |
| 4 2-4 | 40 | 144 | 5,760 |
| 4 Aces | 80 | 48 | 2,400 |
| Straight Flush | 50 | 36 | 1,800 |
| Royal Flush | 800 | 4 | 3,200 |
| | | 620,580 | 954,492 |

Using the above figures, the following determinations are made.

This poker game has

Total Payout Value: 954492

Total Elements: 620580

A prize pool using these figures will have 620,580 non-zero elements with a total value of 954,492 units. Next, determine a base participation percentage.

Per Game Cost: 1 Unit/Game-play.

1 out of 2 Participation Percentage yields: 620580/0.5=1241160 Game-plays/Pool.

Pool Gross Income: 1,241,160 units.

½ Participation Percentage works for this game.

Using ½ Participation Percentage Yields A Payout Rate Of Approximately 77%.

Using this poker game in the entertainment display works at a participation percentage of 1 out of 2 (or ½, 50%), and the casino will have a 23% take. This is the "base" participation percentage; any participation percentage having a larger denominator (less value) than this base rate will also work (i.e., 1 out of 3, 1 out of 4, etc.). "Work" is being defined as providing the casino or bingo hall with a known, positive, fixed percentage of the gross intake for game play (per pool).

Participation percentages are generally thought of in terms of "1 out of X" at least partially because there must be at least one winner in any bingo game. The participation percentage (PP), when applied to the number of players, must be larger than 1 (this is saying there will always be at least one winner per game). Example: a ½ PP applied to 2 players yields 1. A ⅓ (1 out of three) PP applied to 2 players yields 0.67, less than one. If two players were allowed in a game having a PP of ⅓, this means there may be bingo games without a winner which does not meet the requirement that there be at least one winner per bingo game.

The simplest way to manage bingo game play as it relates to operator hold is to require that the number of players per game be evenly divisible by the denominator of the PP (i.e., a 1 out of 5 PP means there must be 5, 10, 15, 20, etc. players per game). This would result in a guaranteed constant payout to players (and thus a guaranteed fixed operator take) on a per game basis. Operating this way is fairly straightforward for games having PPs such as 1 out of 2 or 1 out of 3, but becomes more difficult for games having PPs such as 1 out of 10. If a casino did not have enough players to make up even multiples 10 all the time, or did not have enough players to make a next increment (in this case 20 players, 30 players, etc.), the players who wanted to play could end up waiting for long periods of time. Generally, this is unacceptable.

Rather than guaranteeing a fixed operator hold on a per game basis, the system of the present invention can guarantee a fixed operator take on a per pool basis. Note that the choice between these solutions may well depend on regulations applicable to the local jurisdiction where the bingo games are in use. Generating the casino's or bingo hall's hold percentage on a per pool basis enables individual bingo games to be played with a more variable number of players during the life of the pool. Numerous solutions to guarantee that each bingo game will have at least one winner, coupled with exhausting each prize pool using the specified number of bingo cards will come to the mind of a person both skilled in this art and having the benefit of the present disclosure. Several are discussed below.

In one embodiment, based on generating an operator's fixed percentage take on a per pool basis, when the number of prize elements remaining in the primary pool reaches a predetermined number the backup pool will become active and will be designated as the secondary pool. Prizes will be allocated from both the primary and secondary pools until the primary pool is exhausted. The secondary pool becomes the primary pool, and a new backup pool is generated from the applicable pool template. Prizes are drawn from the new primary pool until it reaches the predetermined number of remaining elements, and the backup pool becomes a secondary pool. Prizes are drawn from both until the primary is exhausted, at which time the secondary pool becomes the primary and a new backup pool is generated from the appropriate template.

In a closely related embodiment to the two pool method described above, a plurality of pools are used. A primary pool is generated and put into use. When the pool is depleted by a pre-specified percentage, a second pool is created and put into use. Prizes are picked from each pool in a round-robin fashion. When the second pool is depleted by a pre-designated percentage, a third pool is generating and put into use. Prize selection uses all the active pools, picking prizes from each pool in a round-robin fashion. This continues, adding new pools as the previously generated pool or pools reach a specified percentage of depletion. Older pools will close as soon as they reach zero elements. Depending on the actively level at a bingo hall or casino, it may be desirable to have an additional pool become active when the youngest pool is, for example, only 35% depleted (rather than a more conservative 50 or 75% depletion state). Prizes will be picked from all open pools in an even manner, such as a round-robin pick method, such that the oldest pool will be depleted and closed before the younger pools. The process continues (repeats) until game play stops.

Due to its conceptual simplicity and ease of implementation, a method using two or more active pools where new pools are generated as previously opened pools reach certain depletion points, and where the open pools temporally overlap in usage, and where elements are picked from each open pool in an evenly distributed manner, is currently the preferred embodiment.

Just as there may be regulatory requirements that determine if the operator hold percentage needs to be determined on a per game or per pool basis, there may be regulatory reasons for preferring one pool element distribution method over another, or, there may be a reason to use a method of prize pool element distribution not explicitly discussed herein. Any and all such methods using a prize pool as a basis for allocating prizes for bingo play are contemplated by the present disclosure.

In one preferred embodiment the number of prizes awarded in a game will be the number of players times the PP, rounded. For example, if there were 5 players in the example poker game, the number of prizes awarded would be round(((½)*5)+0.5)=round(2.5+0.5)=round(3.0)=3. The prize_element_counter is decremented by 3, and the game_play_counter is decremented by 5.

Whichever method of prize pool use is chosen, the use of bingo prize pools fully enables varied prizes and awards over a plurality of wager levels while maintaining a fixed, constant payout rate and operator hold rate, as well as enabling the realistic mimicking of games of chance in an entertainment display. This constant or fixed operator hold rate makes the game a non-banked game, where the players compete with each other (in this case, for elements from the bingo prize pools) and not the house. This is the same as traditional bingo halls charging their fixed fee for each bingo card (i.e., keeping 10% of the purchase price for each bingo card and using the rest in the game awards). As stated above, local regulations in use throughout the United States will be determinative as to which particular method may or may not be used to calculate hold and payout percentages. Whatever methods are used, the use of prize pools enable bingo games to be played that have a constant operator hold and a constant player pay-out.

The use of prize pools may readily be used to dispense non-monetary prizes as well as game credits or monetary prizes. In one preferred embodiment, the non-monetary prizes will be awarded to players directly from a BPT. An exemplar gaming machine capable of issuing non-monetary prizes upon the occurrence of a winning event is currently being manufactured and sold by Sierra Design Group, Inc., of Reno, Nev. These machines may be seen in use in Nevada-style casinos or at Sierra Design Group's website, http://www.sierradesign.com. This machine, with software for bingo play rather than the currently used slot machine software, could readily be used to enable the issuance of non-monetary awards or prizes during bingo play. The bingo prize pools would be generated in a same manner as described above, with the direct award prizes having values that correspond to values assigned to elements of a prize pool. When a player wins a prize from the prize pool, the element is checked and if it corresponds to an item awardable from the BPT to the player, a corresponding signal will be sent to the container having the prize therein, making it available to the player.

Additionally, the prize pool elements could correspond to prizes not immediately available, where a player is issued a voucher that may be used to get the prize at a different location, or simply at a cashier's station or prize redemption kiosk. This further enables large prizes such as cars, motorcycles, ore-laden asteroids in Saturn's belts, galactic ringworlds, etc., to be awarded as prizes.

In such cases, each non-monetary prize element will have an equivalent monetary value (to the casino or bingo hall) that will be used in the generation of elements for the bingo prize pool. It may be the case that there will applicable regulations which either prevent the issuance of non-monetary awards, or, dictate how the operator must value them. The bingo game system of the present invention is readily adaptable to all such legal environments.

Figure 9:
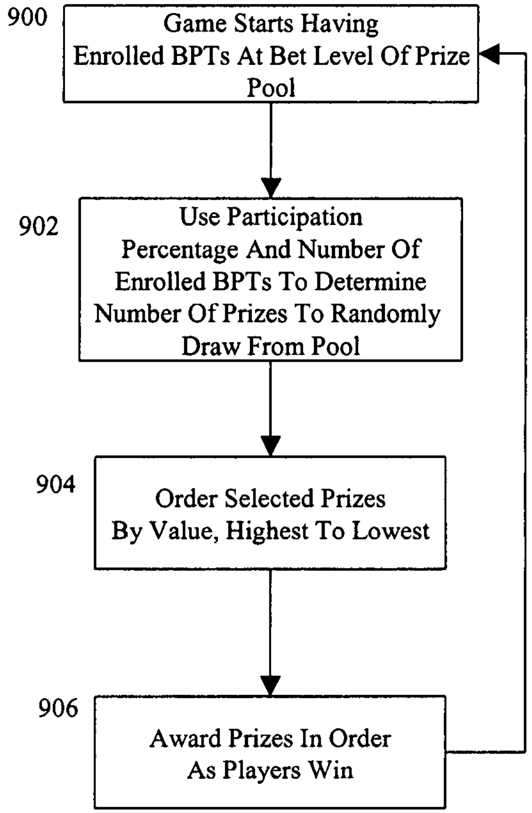
FIG. 9 is a flow diagram showing bingo prize pools in use in accordance with the present invention.

FIG. 9 shows an example of bingo prize pools in use. Box 900 corresponds to the actions of starting a bingo game, the bingo game being one bingo game from a possible set of bingo games that form a bingo session. Note that a session may have only one game in it, depending on the machine use rate and the availability (or lack thereof) of wagering levels in a particular casino or bingo hall. For any bingo game there will be at least one corresponding active bingo prize pool usable by the BGM running this particular game and session, where the correspondence is determined by the wagering level, as explained above. Once the session is started, the number of players enrolled (or the number of bingo cards enrolled, if multi-bingo-card BPTs are used) in each game in the session will be known. Box 900 is left for box 902.

The actions corresponding to box 902 are those used to determine the number of prizes to pull from the active pool or pools, and the random selection of that number of prizes from the elements in the prize pool or pools. To determine the number of prizes to select from the active pool, the total number of enrolled players is multiplied by the participation percentage, Number_Of_Players*pp=Number_Of_Prizes, as discussed above (another preferred embodiment uses the algorithm discussed below in FIG. 18), or alternatively an algorithm is used which makes use of a lookup table or other deterministic means using the number of players, PP, and/or prior activity and game history to determine the number of prizes to give out for this bingo game.

Drawing from the active prize pool or pools is done in a randomized manner. A random number generator is used to generate a random sequence which is mapped into the elements of the prize pool, resulting in a random draw of elements from pools. These elements are then taken from the pool or pools for use with the current game. Note that if the prize pool elements are each drawn from a different pool, the drawn set is already a random selection. Continuing to box 904, the drawn prizes are ordered by value, highest first. The prizes are now ready to be awarded.

Continuing into box 906, the ordered awards are now ready to be given to players. The first prize (having the highest value) will be given to the player who first achieves a defined bingo pattern, defined in one embodiment as any 5-square vertical, horizontal, or diagonal line. The rest of the prizes are awarded as more balls are shown and more players can make lines (or other patterns, as defined by the game rules). This continues until enough winners are selected to receive the prizes drawn from the prize pool. Note that all prizes will be given out, since any bingo ball draw, if taken to the final $75^{th}$ ball, will result in all enrolled cards being blacked out. Since there are always fewer prizes than cards, and each card will have a winning pattern, all prizes will be awarded (even if not claimed, as when a player leaves an active game). It is possible to play bingo in a way that enables more than one prize to be awarded per active player, as may be the case when a player has a bingo card such that the ball draw fills out more than one 5-square line before another bingo card completes any of the designated sequences. In the currently preferred embodiment this does not happen. Once a player wins a bingo prize during a game, that bingo card and player are not eligible to win further prizes for the duration of the game. The player, once claiming a prize in a bingo game and therefore not being eligible for further prizes in that game, may enroll in a next game without waiting for the current game to end. Immediate enrollment in a next bingo game after winning a prize (or losing) in the current game is available to all enrolled players who have a winning event (i.e., consolation prize wins), not just the bingo winner. Once an enrolled player is a loser or a winner, the BPT awards the player the prize (or issues a voucher), and immediately sets itself as ready for a next game play (to enroll in a new bingo game).

Box 906 then leads back to box 900, where the process repeats for each game in a session, for all sessions.

Note the flow described for FIG. 9 does not necessarily include separately awarding bonus prizes using a separate pool (for either fixed prize amounts or progressive prize amounts), which may be running simultaneously for each bingo game. The BGM would then award players from both sets of pools after the game ended.

Figure 10:
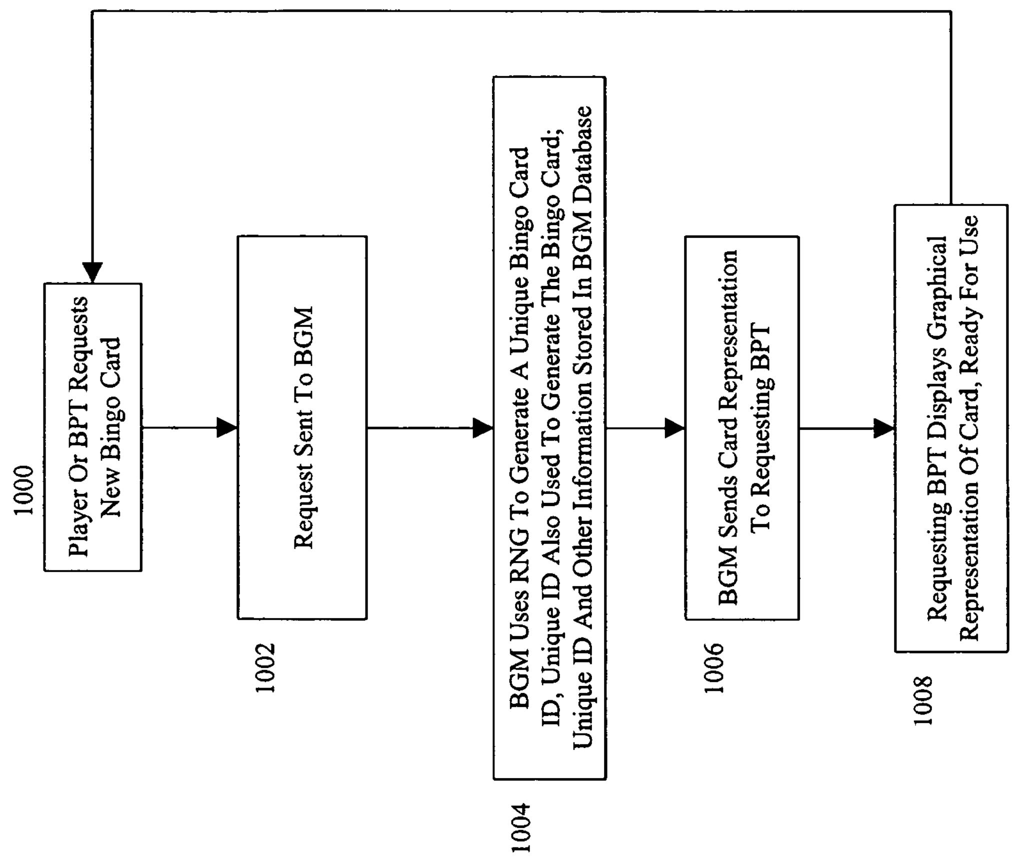
FIG. 10 is a flow diagram showing bingo card generation in accordance with the present invention.

Continuing with FIG. 10, shown is a sequence for creating bingo cards when needed. The actions corresponding to box 1000 are those associated with the initiation of a bingo card request. Bingo card requests will typically be generated by a player at a BPT (between games) or upon a BPT initializing itself and needing its first card. Continuing from box 1000 to box 1002, the request will be sent to the BGM. After the BGM receives the request, box 1002 is left for box 1004, where the actions needed to generate a bingo card and store information in a database are taken.

The BGM generates a unique 32-bit number using RNG output. This number is used to produce a unique bingo card (using a proprietary algorithm) as well as being used as a unique card ID. Further, in a preferred embodiment the BGM will keep the machine ID of the machine making the card request, time of creation, and type of request. After creating the database entry and associated log file, box 1004 is left and box 1006 entered, where the actions taken are to send the card to the requesting BPT. Finally, box 1006 is left and box 1008 entered, where the actions taken correspond to those carried by the BPT to display the card to a player.

The flow chart shows an arrow returning to box 1000, which corresponds to the system being ready to process any additional bingo card generation requests on an as needed basis.

The term "virtual bingo card" will be used to mean a bingo card generated, stored, and "moved" within the system of the present invention using the above described method, or alternatively any electronic, photonic, combination, or other currently unknown logic circuitry and method that does not use bingo cards in a media discernable to an ordinary player as a bingo card as an interim result, before being transformed and/or interpreted by logic to be displayed to a player (for example, does not produce a deck of pre-printed bingo cards, although a player may choose to have a BPT print them a copy of the bingo card they are playing, once it has been displayed). A virtual bingo card may be displayed (made visible to a person or player in the form of traditional looking bingo card) on a display associated with any computer in the system of the present invention (such as a BGM) as well as a BPT or redemption station. The way in which a virtual bingo card may be displayed to a player is not limited to a video display, although that is the currently preferred embodiment. Other display means, including but not limited to individually rotatable mechanical plates having bingo indicia thereon for each square in a bingo card, miniature rotatable multi-sided cuboids with bingo indicia on different faces, LCDs, electroluminescent panels, currently unknown or currently too expensive display means such as holographic displays, may all be used equally well with the virtual bingo cards of the present invention.

Similarly, the term "virtual prize pool" is used in this disclosure to mean a prize pool initially having a set of elements generated as described herein, that is generated, stored, and "moved" within the system of the present invention using previously described methods, or alternatively any electronic, photonic, combination, or other currently unknown logic circuitry and method that does not use a media discernable to an ordinary player as prizes, and must be transformed and/or interpreted by logic before being discernable as a prize (or prize amount or value) to be displayed to a player.

Figure 11:
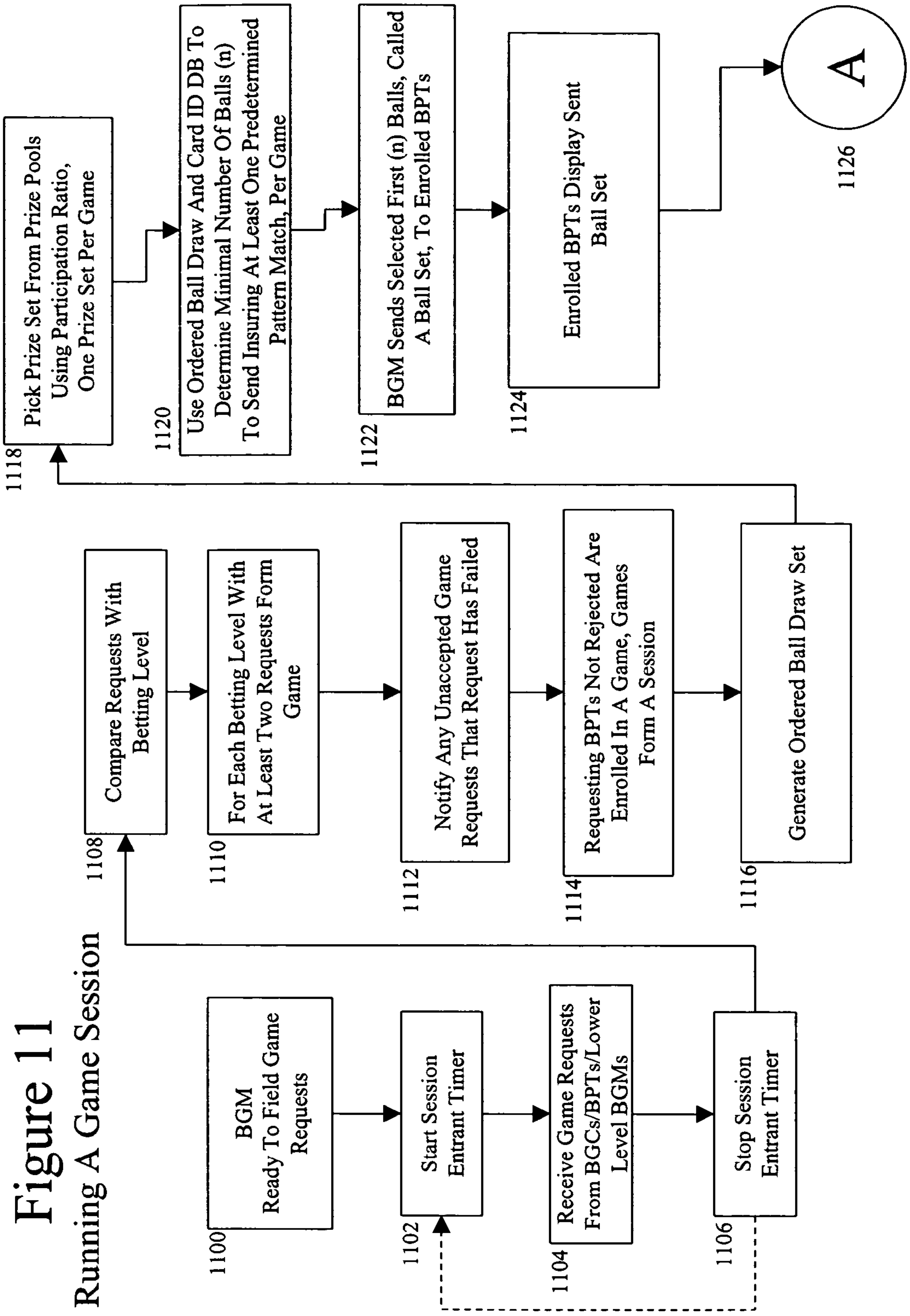
FIG. 11 is a flow diagram illustrating the running of a bingo game session in accordance with the present invention.
Figure 12:
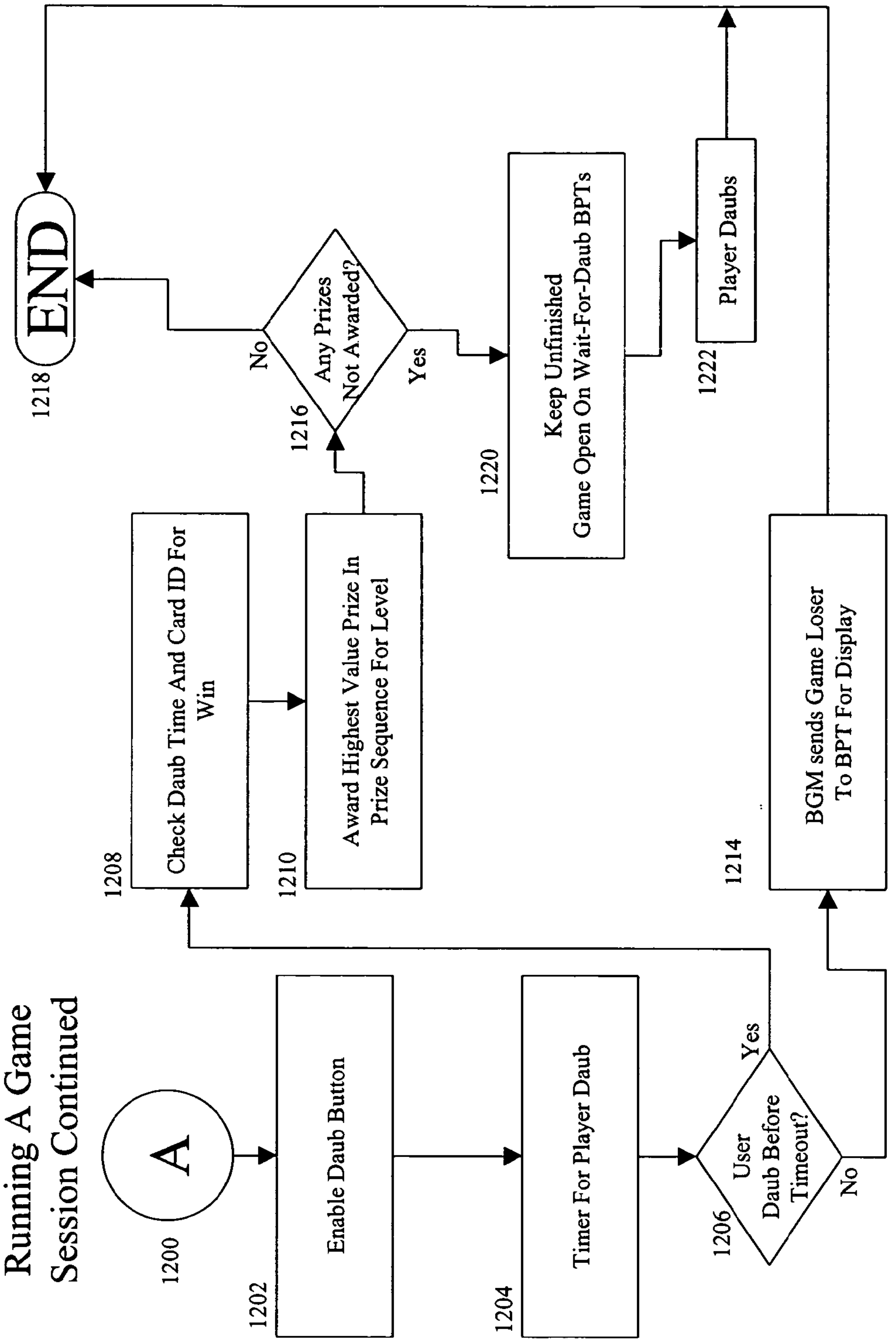
FIG. 12 is another flow diagram illustrating the running of a bingo game session in accordance with the present invention.

FIGS. 11 and 12 illustrate the running of a game session in accordance with the present invention. Starting at box 1100, the actions corresponding to this box are an available BGM making itself ready to start a session by being ready to accept game requests. Continuing with box 1102, at least one timer is set enabling the BGM to know when to stop enrollment for a game, or, if the game is under-enrolled, when to send the game requests to the next level BGM, $BGM_2$. Note that individual session and game play will work the same in all levels of BGMs, except level 3 BGMs will send out failure-to-enroll messages to the BPTs if level 3 times out. Continuing into box 1104, the BGM continues to receive game requests from the BPTs (if there are physically separate BGCs, the BGCs act as pass-through devices for all the game play related messages). Collection continues, and box 1104 is left for box 1106.

The actions corresponding to box 1106 are to terminate new enrollments for the currently active game, while opening enrollment for the next game (the later shown by the dotted line connection back to box 1102). Continuing into box 1108, the actions correspond to checking game requests and wagering levels. In one preferred embodiment which uses game objects, this corresponds to reading a single variable in each game object just closed, since each game object has been instantiated with the data from game requests at the game object's betting level.

Continuing into Box 1110, all game objects just closed with the required minimum number of game requests will form a session. Continuing into box 1112, any requests that cannot form a game will, in one preferred embodiment, be sent to the next level of BGM or, if the current BGM is the top level of BGM for this installation, send out failure messages to the requesting BPTs. Some installations will have level 1 and level 2 BGMs only, while others will have all 3 levels. For smaller installations there may only be level 1 BGMs. Box 1112 is left and box 1114 entered.

The actions corresponding to box 1114 are those associated with forming a session with games that have enough enrollees. There will be a game per wagering level. In one preferred embodiment, a session comprises a set of game objects, each game object having at least the minimum number of individual game requests instantiated in the game body. Continuing from box 1114 to box 1116, the actions taken are those required to create a ball draw. In the BGM a full set of 75 balls is drawn in a randomized order, kept as an ordered sequence. The full ball draw sequence is not sent to the BPTs yet. Continuing into box 1118, the actions taken are those required to draw a calculated number of prizes from each prize pool that has an active game. The number of prizes to be picked from each prize pool has been described above. The selected prizes will be called a prize set. Prize sets may be stored in a BGM or BGC. In an alternative embodiment the prize elements will be selected after the winners for a bingo game have been determined. Box 1118 is left for box 1120.

The actions corresponding to box 1120 are those taken to determine how many of the ordered ball draw to send to the enrolled BPTs. This determination is made on a per game basis, so a different numbers of balls will typically be sent to those BPTs enrolled in different games. The BGM uses the bingo card database to compare the drawn ball set to the bingo cards of enrolled BPTs (per game). The BGM determines when a first winning event occurs (a winning pattern) on any of the bingo cards enrolled in a particular game in this session, creating a first drawn ball subset from the first ball to the ball that enables the first winning event. Box 1120 is left and box 1122 entered, which corresponds to the BGM sending the first drawn ball subset to each enrolled BPT.

Note that a different set of balls will typically be sent to the BPTs enrolled in different games. This is due to the fact that there will normally be a different set of bingo cards used (enrolled) in each game, resulting in a different number of balls being drawn to enable a winning pattern to be daubed by a player. If a BPT allows multi-card play and the player is enrolled in different games, then the corresponding ball draw for each active game on that BPT will be sent. In an alternative implementation the BGM or BGC may assign bingo cards on a per-game basis, in which case the number of balls required to enable a winning pattern on an enrolled card per game could be same for all games in a session. Box 1122 is left for box 1124, having actions corresponding to that needed to display the sent ball sequence on a screen to a player (including multiple sequences if a player is using a multi-card BPT). Box 1124 points to flow continuation point 1126, showing continuity to FIG. 12.

Continuing with FIG. 12, flow continuation point 1200 continues from flow continuation point 1126, entering into box 1202. The actions corresponding to box 1202 include having received and displayed a set of bingo balls to a player, and then enabling the BPT's "Daub" button. Visual clues are provided to a player by the BPT's software to remind the player to daub. If a player has a potentially winning combination, the player must daub the card by touching the daub button. Upon touching the daub button, balls from the display are compared with the player's card and any that match are colored by changing the applicable square's background color (other visual techniques may be used as well). Box 1202 is left and box 1204 entered.

The actions corresponding to box 1204 are those associated with running a timer for a player to daub. Players may be given a plurality of reminders. In a preferred embodiment, this includes a textual reminder, a horizontal alert bar that progressively fills from left to right, and preferably coupled with an audio alert, indicating player action is required. A player either does or does not daub during that period. The daub period is typically set to three seconds. Box 1204 is left and decision diamond 1206 entered.

Diamond 1206 corresponds to noting if a player daubed their card in time or not (touched the daub button before time-out). If yes, the "Yes" exit is taken to box 1208. The actions corresponding to box 1208 are the sending of the daub information to the BGM, where the BGM checks the daubing log, ball draw sequence, card ID, and machine ID for any prize. Continuing with box 1210, if there is a winning combination on the player's card, the BGM selects a prize, where the preferred embodiment selects the highest valued prize from the prize set, and awards it to the player. If there is an apparent tie, the award value is split accordingly or the daub timer is used to see which player actually daubed first. In an alternative embodiment the prize value is assigned separately from the BGM determination of winnings; in such cases the BGM would mark the winning enrollee BPT record as a winner and the prize would be selected from the prize pool by another BGM, BGC, or the BPT. Box 1210 is left and decision diamond 1216 entered.

Returning to diamond 1206, if a player did not daub in time then the "No" exit is taken to box 1214, where the BGM instructs the BPT to show a losing screen on the BPT. In a preferred embodiment, if a player did not daub in time they forfeit their potential prize for that card, and their game is over (going to end point 1218). In alternate embodiments, the player may still be eligible to win other prizes if a further match occurs in continuing game play (not shown).

If the BPT had no winning combination, then the actions taken would be for the BGM to select a next set of balls to send to each active game's BPTs. This is done in the same way described earlier for the initial set of balls sent to the BPTs, except that the pattern matching begins with the active (enrolled) cards being partially filled out and the ball sequence being examined starts with the ball immediately after the last one sent to the BPTs. As soon as a next winning pattern is determined, the incremental set of balls determined by this next sequence is sent to the BPTs, and displayed. This path is not shown, but will be the one carried out for each non-winning bingo card until the game ends.

At diamond 1216, if the prize set is empty (normal game ending condition), the "No" exit is taken to end point 1218. If there are prizes in the prize set, then the "Yes" exit is taken to box 1220. The actions corresponding to box 1220 are those associated with one or more players who have not daubed and who had a winning pattern on their cards, so the prizes have not been awarded. In this case, the BPT will remain with an open game (waiting for a player to daub) until a player daubs. If a player walks away from a game in play, any player who next sits at the BPT may daub the card and be awarded the prize. It is not expected that this will happen very often, but the bingo game cannot close until some player claims the prizes allocated to this game from the prize pool (in an alternative embodiment, only the final prize is required to be daubed by a player; previously unclaimed prizes are forfeited after the daub time-out period and are returned to the pool or used as additional value added to prizes in on-going progressives applicable to the BPT). The game sits, waiting for a player to daub, leaving box 1220 for box 1222. The actions corresponding to box 1222 are those associated with a player finally using the daub button. As soon as that happens, any prizes waiting to be awarded are awarded and the game is closed, continuing to end point 1218.

Figure 14:
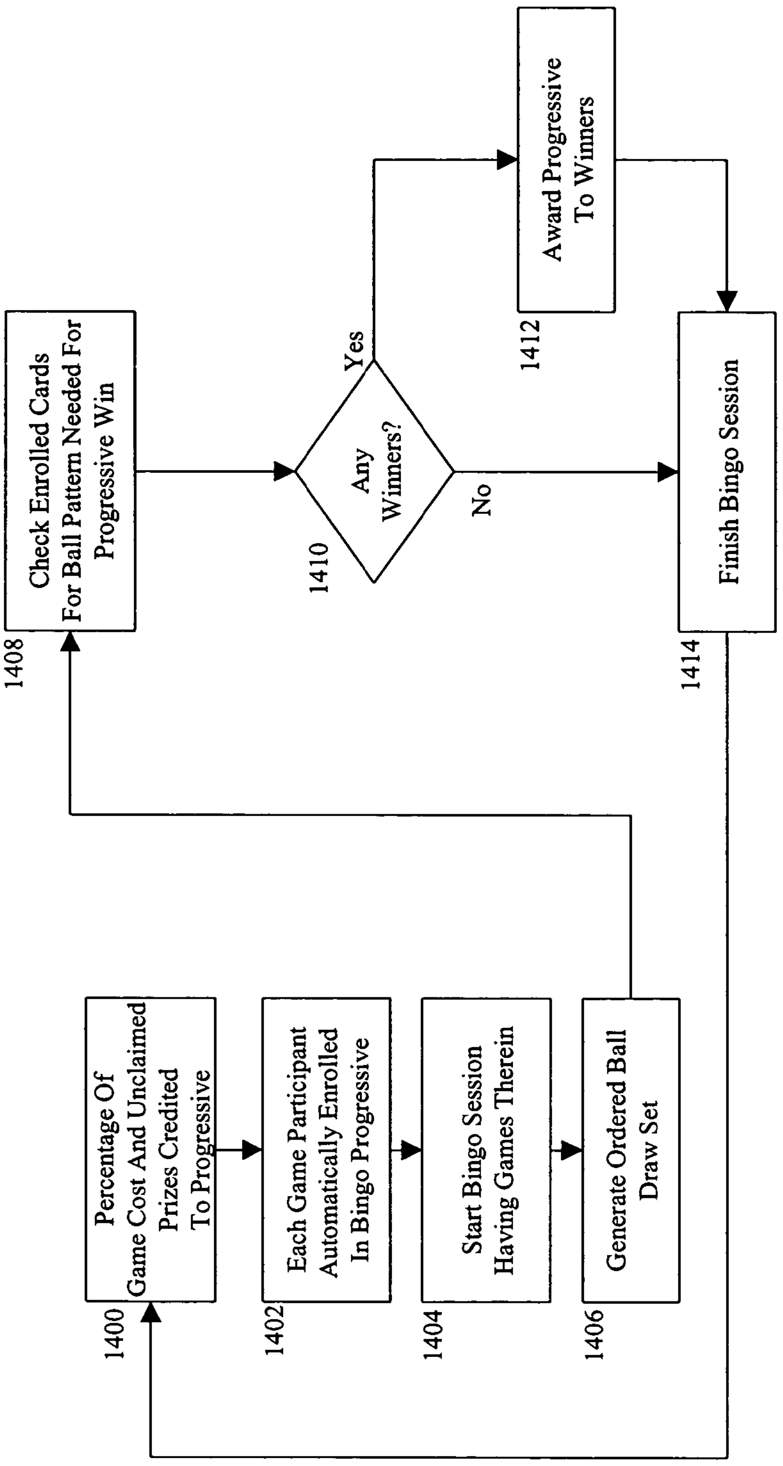
FIG. 14 is a flow diagram of a player-funded bingo progressive in accordance with the present invention.

Referring to FIG. 14, a player-funded progressive in accordance with the present invention is illustrated in flow diagram form. For non-banked mode use, it is important to note that progressives are both entirely player-funded and are awarded to a player upon the occurrence of a winning event. The casino or bingo hall has no stake in the progressive, nor derives any income from the progressive. The goal is to add excitement to bingo play while preserving the fixed operator (casino, bingo hall) hold derived from bingo games (this is the same thing in electronic form as taking a fixed percentage of a bingo card sale).

Starting at box 1400, a fixed percentage from each bingo card sale (each time a BPT is enrolled into a bingo game, or each time a card is enrolled in a bingo game for multi-card BPTs) is allocated to a progressive. Ordinary this is expected to be a fairly low amount, such as ½%, but can typically varies from ½% to 5%, and in one embodiment is selectable by the operator according to their desires (may be set by others who are running a progressive if the progressive spans more than one casino, bingo hall, or bingo facility owned by a single operator). Continuing from box 1400 into box 1402, each person who is enrolled in a bingo game is automatically entered into any on-going progressive. Box 1404 is then entered, where the actions corresponding to this box are those needed to actually start a bingo game session, having at least one bingo game therein, as more fully described above. Box 1404 is left and box 1406 entered.

The actions corresponding to box 1406 are those associated with generating an ordered ball draw useable for this bingo session. Continuing into box 1408, the actions associated with this box are to check all bingo cards enrolled in the current game for a match to the progressive, in the same way as described above for checking winning patterns against currently enrolled bingo cards. Box 1408 is left for diamond 1410, where it is decided if there are any progressive prize winners. If there are none, the "No" exit is taken to box 1414, which corresponds to the actions needed to finish the current bingo game. As soon as the game is finished, box 1414 is left and box 1400 entered, starting the process again.

If, at diamond 1410, there was a progressive winner, then the "Yes" exit is taken to box 1412. The action corresponding to box 1412 are any needed to award the progressive prize to the winner(s) (notice there could be more than one, in which case the progressive is split accordingly). Depending on the size of the award, this may require a voucher to be issued to the player who then redeems it later for the prize. After dispensing the prize, printing a voucher or similar action box 1412 is left and box 1414 is entered, and the loop as described above continues.

Progressives can take many forms. One preferred embodiment is called four-corners, where a player must fill in each of a bingo card's four corners during the first four balls drawn for this game. If a lower prize occurrence frequency is desired, which corresponds to a higher progressive prize jackpot, then patterns may be selected that require 5, 6, or other number of spaces that must be filled in a prescribed number of balls. An example would be a requirement to fill a specified 5 spaces in the first 6 balls drawn for the game. Other progressive games will come to mind of a person skilled in this art and having the benefit of the present disclosure; any identifiable and quantifiable bingo card pattern may be used. The bingo game of the present invention manages potential progressive wins in the same way as the designated bingo card patterns needed to win regular bingo. That is, after the ordered ball draw for the current session is created, for each game the BGM checks the enrolled bingo cards for both regular bingo pattern winners and progressive winners, stopping the ball checking sequence upon the first occurrence of a progressive or regular bingo win. That initial ball sequence is then sent to the enrolled BPTs, and a player must daub to win. From the BGM's viewpoint, the functionality required for the progressive adds very little to that already used for regular bingo game play, so is very efficient; there is simply another pattern to check for (the progressive pattern) in addition to the regular bingo patterns while going down the sequence of drawn balls and the enrolled cards. Thus, progressives add little additional overhead to the present system but contribute greatly to player excitement.

Progressives may be designed to work on a per-game basis (different progressive for each wagering level); a per session basis, where any enrolled player gets the same win; or, having a win where the winner gets the full progressive if they bet the maximum amount on the BPT, or a percentage of the progressive jackpot scaled to the wagered amount relative to the maximum wager amount as described above. Other progressive award methods usable with the present invention will come to mind of a person skilled in this art and with the benefit of the present disclosure.

Figure 15:
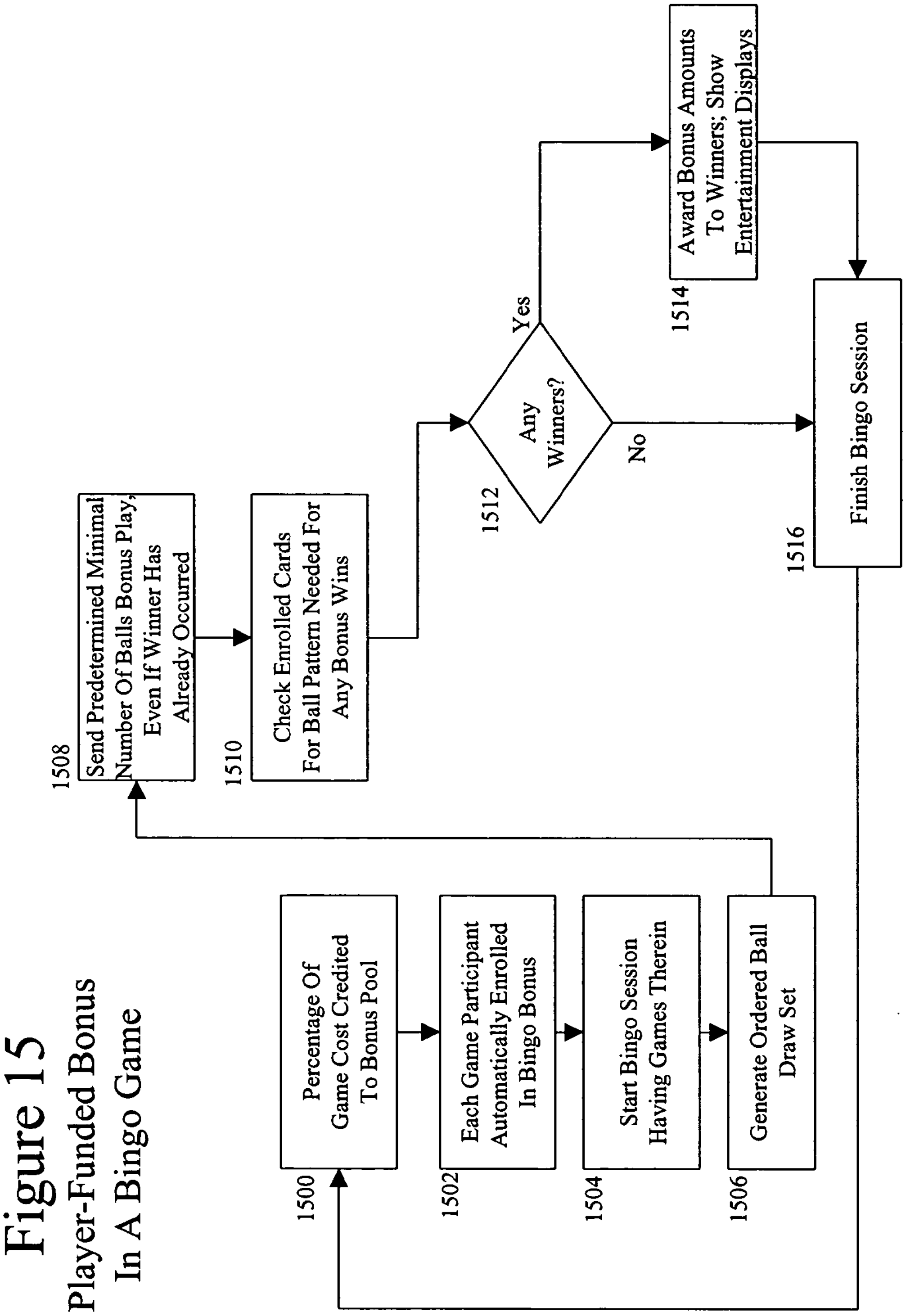
FIG. 15 is a flow diagram of a player-funded bingo bonus award method in accordance with the present invention.

Referring to FIG. 15, a player-funded bonus in accordance with the present invention is illustrated in flow diagram form. For non-banked mode use, it is important to note that bonus pools are both entirely player-funded and are awarded to players upon the occurrence of a winning event over time, ensuring all monies paid in are paid out to the players. The casino or bingo hall has no stake in the bonus, nor derives any income from the bonus. The goal is to add excitement to bingo play while preserving the fixed operator (casino, bingo hall) hold derived from bingo games (this is the same thing in electronic form as taking a fixed percentage of a bingo card sale).

Starting at box 1500, a fixed percentage from each bingo card sale (each time a BPT is enrolled into a bingo game, or each time a card is enrolled in a bingo game for multi-card BPTs) is allocated to bonus pool or pools. Ordinary this is expected to be a fairly low amount, such as ½%, but can typically vary from ½% to 5% and in one embodiment is selectable by the operator according to their desires. Continuing from box 1500 into box 1502, each person who is enrolled in a bingo game is automatically entered into any applicable bonus. Box 1504 is then entered, where the actions corresponding to this box are those needed to actually start a bingo game session, having at least one bingo game therein, as more fully described above. Box 1504 is left and box 1506 entered.

The actions corresponding to box 1506 are those associated with generating an ordered ball draw useable for this bingo session. Continuing into box 1508, the actions associated with this box are to insure that the predetermined minimal number of balls that are to be sent to BPTs for bonus purposes.

In one preferred embodiment, there will be a predetermined minimum number of balls from the drawn ball set that will be sent to BPTs where bonusing is enabled. Game play will proceed as explained in this disclosure-subsets of the drawn ball set will be sent to the enrolled BPTs until a winner occurs. If the number of balls sent to the BPTs is less than the specified minimum (currently expected to be set at 50 balls, but can be any number that works mathematically to give the players the winning bonuses targeted by the operators), then there will be a final set of balls from the drawn ball set to make the final number of balls sent to the enrolled BPTs be equal to the minimum (currently expected to be 50). Note that if the number of balls sent to the enrolled BPTs exceeds the minimal number (due to regular play), no more will be sent for bonus purposes.

Thus, the actions corresponding to box 1508 are those needed to determine if the minimal set of balls for bonus purposes has been sent to the enrolled BPTs. If the minimal number have not been sent (meaning a winner was determined before that minimum number), then a subset of the complete ball draw is chosen (in order, of course), such that the minimal number is met. That subset is sent to the enrolled BPTs, and the players will either daub or have their cards filled in because they had previously chosen auto-daub. Box 1508 is then left for box 1510.

The actions corresponding to box 1510 is for either the BGC or the BPT to check to see if the card or cards enrolled on the BPT have winning bonus patterns. It is a design trade-off to determine if the bonus pattern checking will be done by the individual BPTs or the BGC. Wherever the actual checking is done, the each card currently enrolled is checked for winning bonus patterns. Box 1510 is left for diamond 1512.

In diamond 1512 it is decided if there are any bonus prize winners. If there are none, the "No" exit is taken to box 1516, which corresponds to the actions needed to finish the current bingo game. As soon as the game is finished, box 1516 is left and box 1500 entered, starting the process again.

If, at diamond 1512, there was one or more bonus winners, then the "Yes" exit is taken to box 1514. The actions corresponding to box 1514 are any needed to award the bonus prize(s) to the winner(s), as credits, vouchers, etc. After dispensing the prize, printing a voucher or similar action box 1514 is left and box 1516 is entered, and the loop as described above continues.

Bonus patterns can take many forms. One preferred embodiment is called finishing a square or squares, where a player must fill in all the bingo cells needed to fill in a specified square (i.e., a 2×2 square, a 3×3 square). Other patterns include filling in an entire card (black out), making X's, secondary 5-cell lines (i.e., 5-cell sequences made after the winning 5-cell or 5-square [same thing] sequence has already been determined), and many other patterns will come to the mind of a person having skill in the bingo arts and having the benefit of the present invention; any identifiable and quantifiable bingo card pattern may be used.

Bonuses may be designed to work on a per-game basis (different progressive for each wagering level); a per session basis, where any enrolled player gets the same win; or, having a win where the winner gets the full bonus amount if they bet the maximum amount on the BPT, or a percentage of the bonus amount scaled to the wagered amount relative to the maximum wager amount as described above. Other bonus award methods usable with the present invention will come to mind of a person skilled in this art and with the benefit of the present disclosure.

Figure 16:
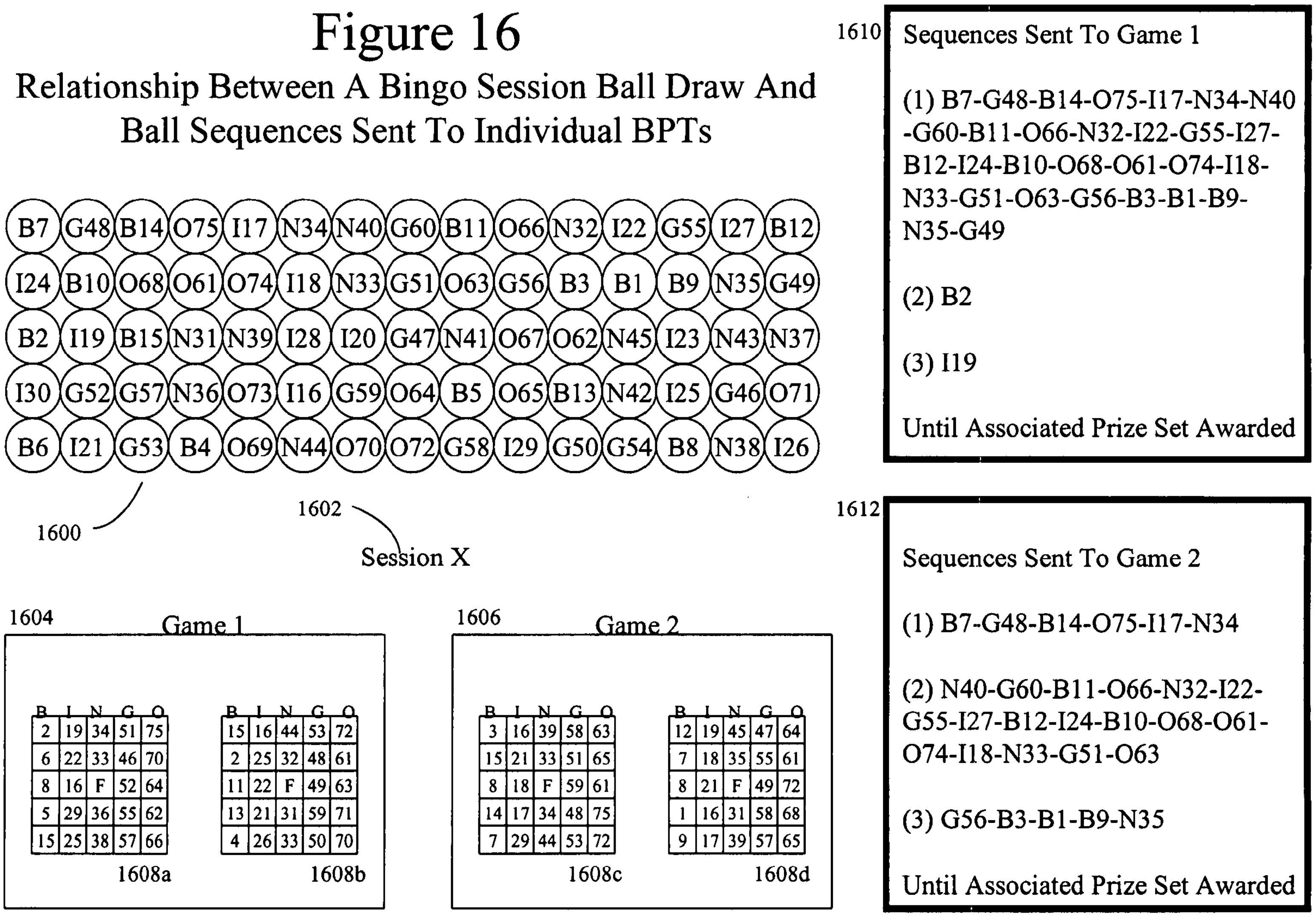
FIGS. 16 and 17 show the use of a single bingo ball draw for a plurality of bingo games.
Figure 17:
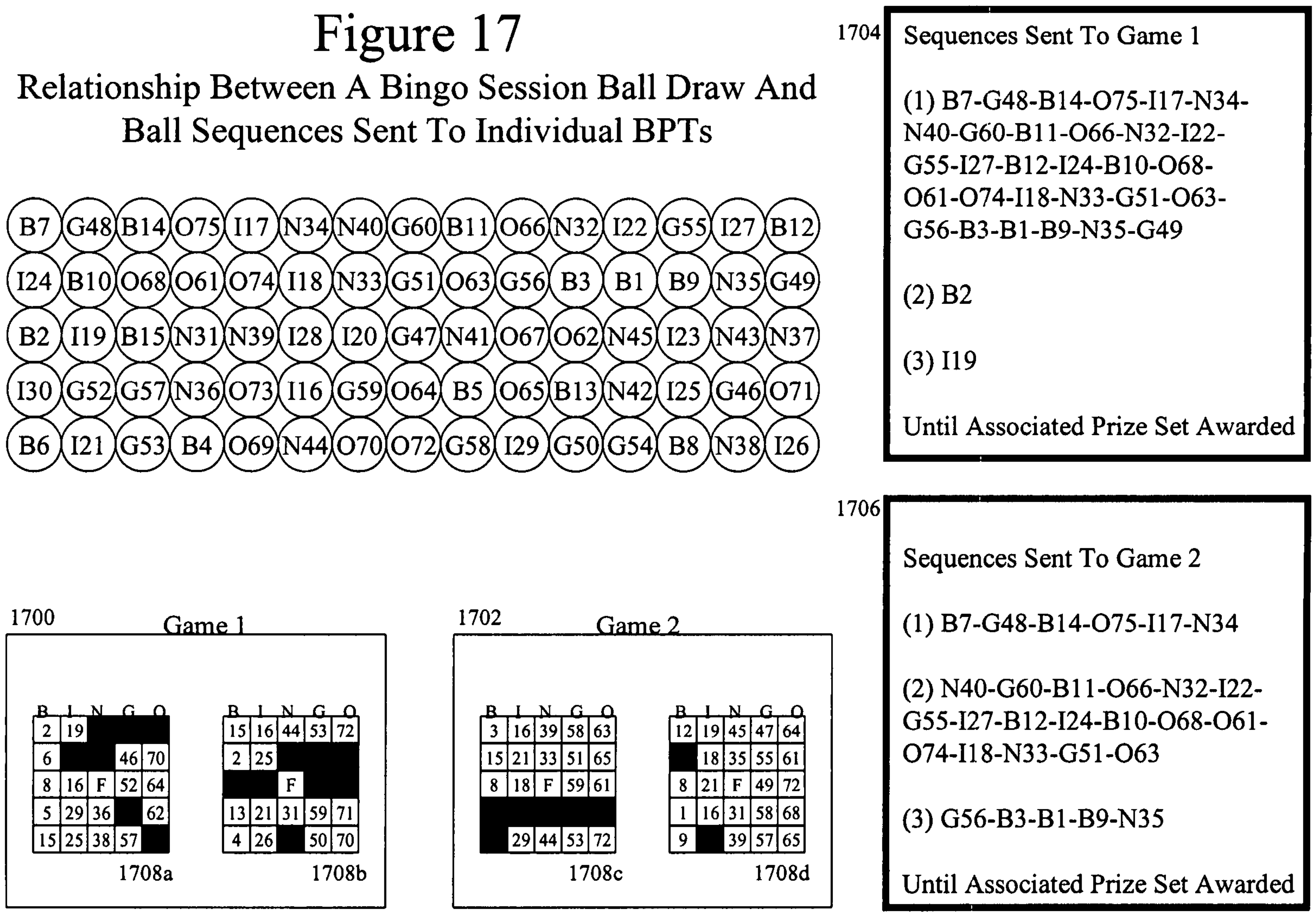

Continuing with FIGS. 16 and 17, shown are simplified exemplars of the relationship between a ball draw (per session) and the ball sequences that would be sent to individual BPTs each having one bingo card and being in a bingo game in this bingo session. This is a simplified example because there are only two enrollees per game whereas in actual systems (a) there may be any number only limited by the number of BPTs in a casino, and (b) there may be BPTs that allow players to play multiple bingo cards per BPT. In (b)'s case each card being played would be uniquely identified by the BGM running the session, and would further be associated with the BPT on which it is being played. This enables the BGM to send needed game play data to the uniquely identified bingo-card/BPT pairs as needed. For the purposes of this illustration, it will be assume a player can win more than one prize on a single bingo card.

Note that the system of the present invention fully enables the use of differing wager levels for each bingo card being played on a single BGM. Each card would be considered a separate bingo game enrollment request, and enrolled in a bingo game based on its associated wager level as described above. In a preferred embodiment, each bingo card shown on a user-visible display (LCD, CRT, plasma panel, etc.) will have a set of player buttons associated with it, enabling a player to play multiple cards independently. Continuing with a preferred embodiment, when a player plays multiple cards at the same wager level, those cards are enrolled in the same game (identifiable to the BGM due to the BPT ID included in bingo game requests) and using a player button associated with one card will have the same effect on all cards in the same game. An example would be using the "daub" button for one card in a game—the effect would be to daub each card enrolled in the same game. For visual clarity, each bingo card enrolled in a game will be assigned (locally, by the BPT) a same color. Non-enrolled cards will be white; enrolled cards will have a background color of the game designer's choosing so as to enable easy visual distinction between cards at a glance (i.e., red, blue, green) and clear viewing of the bingo card numbers, and cards enrolled in the same game will use the same background color. Alternatively, other visual means may be used to indicate game status for players, including colored numbers, colored borders, etc.

FIG. 16 shows a bingo game session X 1602 having bingo games 1, 1604, and 2, 1606. Bingo game 1604 has two enrolled cards shown as 1608*a* and 1608*b*, and bingo game 1606 has two enrolled cards shown as 1608*c* and 1608*d*. For bingo session X, a bingo ball draw 1600 is generated using a random number generator. The BGM has unique identifiers for each enrolled card, enabling lookup of the mathematical representation of each card as needed. The BGM goes through bingo ball draw 1600 in sequence for each enrolled card in each game. The first ball in the sequence that results in at least one winning pattern on a bingo card in a game defines the first ball sequence to send to each enrolled card in that bingo game. Note that although all games in a session use the same ball draw, each game will receive its own set of sequences derived from the ball draw. The first three sequences sent to bingo games 1604 and 1606 are shown in boxes 1610 and 1612 respectively. The first game 1 sequence, 1610(1), sent to bingo game 1604 has a potential winning pattern for card 1608*b*, which can be won if a player daubs. Although a winning pattern has been identified by the BGM, until players daub their balls onto the cards there is no winning card. The first game 2 sequence, 1612(1), sent to bingo game 1606 has a potential winning pattern for card 1608*c*.

Sequence 1610(2) is the next sequence to be sent to game 1. It has only a single ball in it, as daubing that ball will result in a winning diagonal pattern for card 1608*a*. Sequence 1610 (3) is also a single ball, since daubing that will result in card 1608*a* again having a winning pattern. If there were one, two, or three prizes drawn from the prize pool associated with this game (wager level), then they would be awarded and the game would be over as soon as the prizes had been awarded. Otherwise, sequences continue to be sent by the BGM in like manner until all prizes selected from the prize pool for this game have been awarded (won).

Sequence 1612(1), if daubed in by a player, results in a winning pattern for card 1608*c*. Sequences 1612(2) and 1612 (3), if daubed by a player, result in the next two winning patterns between the two enrolled cards.

FIG. 17 shows the bingo cards of bingo game 1, 1700, having been daubed after sequence 1704(1) has arrived from the BGM and bingo cards of bingo game 2, 1702, having been daubed after sequence 1706(1) has arrived from the BGM. The "F" square is a traditional "Free" square found in most bingo game cards, being deemed as filled or daubed in.

Note that for a bonus enabled game, after there was a winning pattern and if the minimum number of balls had not been sent down, there would be a final subset of drawn balls sent to each enrolled BPT to make up the difference. Using 50 balls for bonusing as an example, in the case of FIGS. 16 and 17 having games 1 and 2, both games would be sent a last ball sequence to make up a total of 50 balls, and then the cards (after being daubed) would be checked for winning bonus patterns.

The bingo game system of the present invention may also be run using configurations having modified elements from the non-banked play configuration. One preferred embodiment will use prize pools and PPs, with the prize pools still be associated with a particular wager level and constructed as described above. Each bingo game will be limited to those enrollees having games using the same PP (as above), but will not be restricted to players from the same wagering level.

In a preferred embodiment, an establishment will be using games which all have the same PP so no segregation of bingo games based on PP will be required; in addition, best flexibility and fastest response to player game requests is achieved using games having a PP of ½. Allowing players of differing wager levels to play against each other means that there will be no distinction between bingo games and bingo sessions (the distinction arose from players at differing wager levels not playing in the same games, but being in the same session); each bingo session will be a single bingo game and each bingo game will comprise a bingo session (all using the same PP).

Further, note that it is entirely possible (and is expected to be implemented in a future version of the system of the present invention) that entirely different games (i.e., bingo and keno) could be run on the same system (assuming they have the same PP) in this manner. When a winning event occurs, the winning player is awarded a prize from a prize pool at the player's wagering level. Thus, the ability to make use of complex games for the entertainment display is still fully enabled, and players are awarded prizes commensurate with their wagering level.

This method enables a simpler implementation and operations, and will typically offer quicker game times (since no player has to wait for other players at their wager level to start play). There is one differentiating effect of operating in this configuration as compared to the same-wager-level-games configuration. Operators will still get a calculable hold amount based on pool use and depletion over time, but the operator will be variable.

Figure 18:
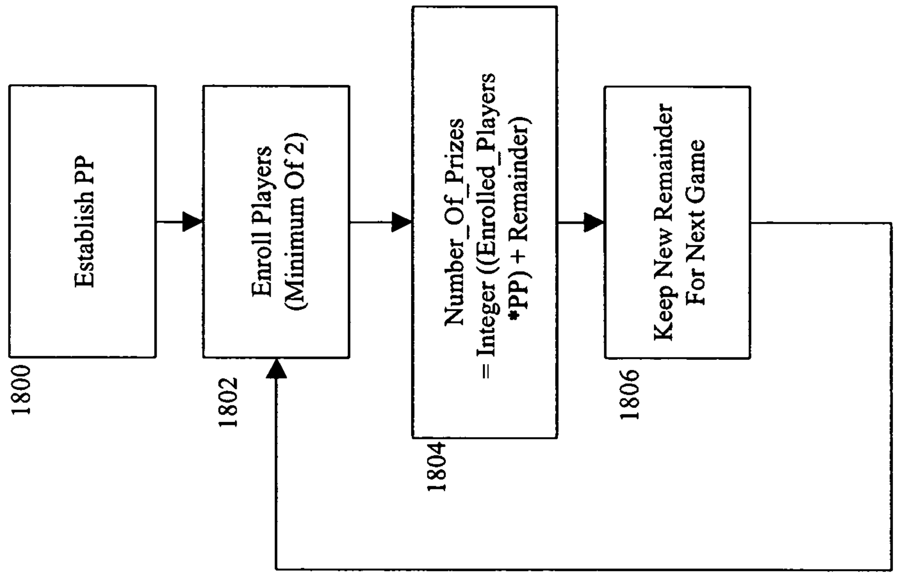
FIG. 18 shows a method for choosing a number prizes to award in a bingo game of the present invention.

FIG. 18 shows a preferred embodiment for determining the number of prizes to be awarded during a bingo game (this method may also be used when games have players at the same wagering level). Box 1800 represents the process of choosing a PP as described above. Once established, box 1800 is left for box 1802. The actions corresponding to box 1802 are those involved in enrolling a number of players at any wager level into a bingo game. There is always an absolute minimum of 2 players; the minimum may be higher depending on the PP. Once the minimum number of players are enrolled, box 1802 is left for box 1804.

The actions corresponding to box 1804 are those needed to calculate the number of prizes to award in this bingo game. The number of prizes to award is equal to the integer portion of the number of enrolled players multiplied by PP plus any remainder from the last game. For the initial game, the remainder is set to 0. As there are bingo games being run in parallel, it will be understood that this calculation will be carried out on a per game control thread (or process) in each BGM. Continuing with the example, if the PP is ½ or 50%, and the number of enrolled players is 5, and the remainder is set to 0, then the number of prizes to award in this bingo game is INT((5*0.5)+0)=INT(2.5+0)=INT(2.5)=2, with a remainder of 0.5. If the next game being run by this process (thread, or other sequential software component) has 9 enrolled players, the number of prizes to award in that game would be INT((9*0.5)+0.5)=INT(4.5+0.5)=INT(5)=5 with a new remainder=0. After the number of prizes to award is calculated, box 1804 is left for box 1806, where the new remainder is kept to be used in the calculation for the next game.

Box 1806 then continues into box 1802, where the loop continues until the bingo game system is shut down, restarted, etc.

Figure 19:
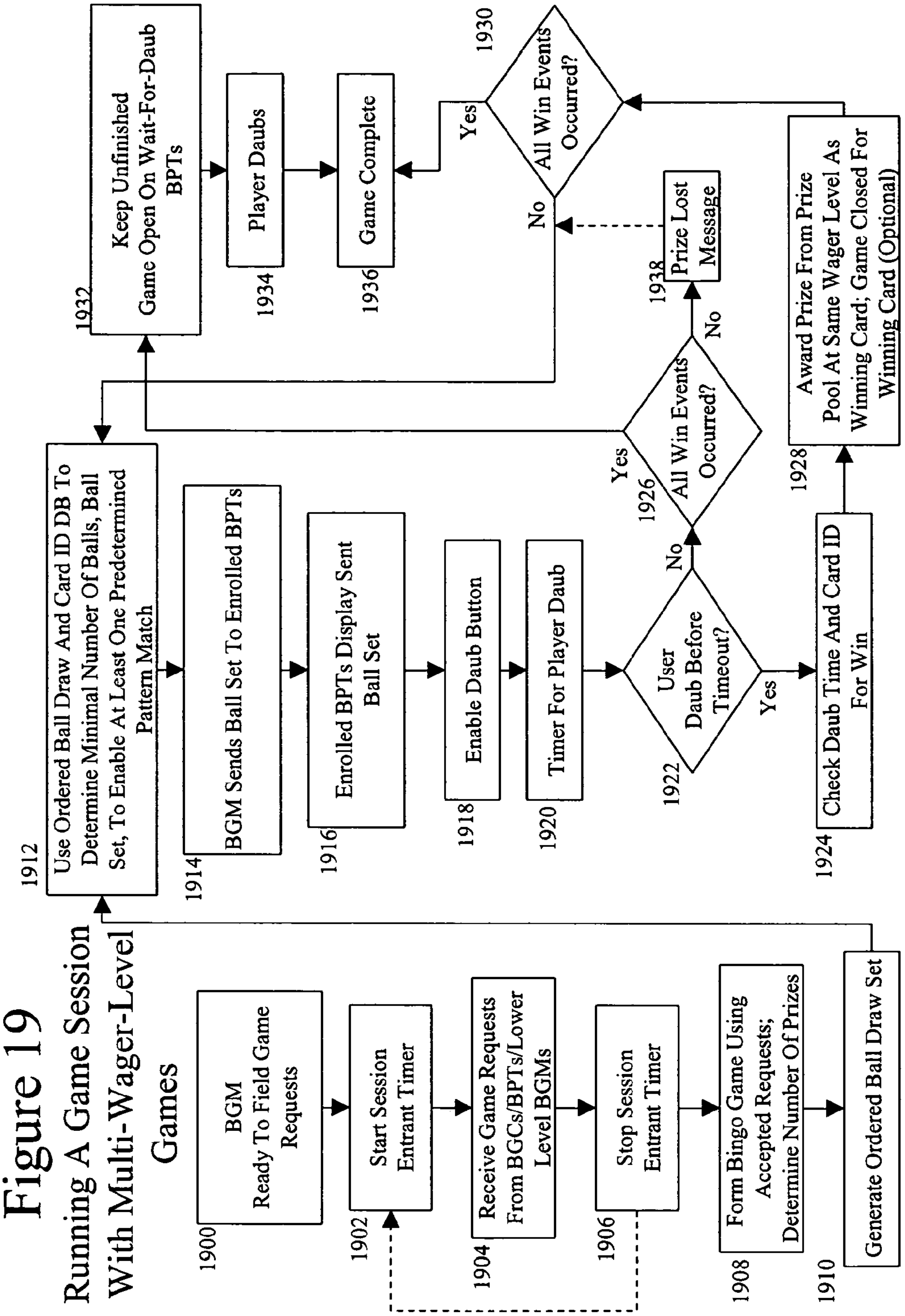
FIG. 19 is a flow diagram illustrating game play using multi-wager-level games in a bingo game of the present invention.

FIG. 19 illustrates a bingo game session method. A session will be functionally equivalent to a single game when multiple wagering levels are enrolled to play against each other. Starting with box 1900, there is at least one BGM in the bingo game system ready to accept bingo game requests. Continuing into box 1902, the actions correspond to initializing and/or starting a session entrance timer. The timer may be a fixed value or may be dynamic, where the dynamic implementation will have a ceiling (a maximum amount of time) which will be reduced based on the average number of players enrolled for each game (or similar algorithm). Box 1902 is left for box 1904.

The actions corresponding to box 1904 are for the BGM to receive bingo game requests from BPTs, BGCs, or lower-level BGMs (depending on the system configuration as a whole, and what level of BGM is receiving the game requests). Game requests are received and stored, preferably in a game object instance. Box 1904 is left for box 1906. The actions corresponding to box 1906 are to stop the game entrance timer, which stops the particular game object instance from accepting any further game requests (will work with any other chosen software entities, not just objects, although objects are the preferred embodiment). Box 1906 is left for box 1908.

The actions corresponding to box 1908 are to form a bingo game (functionally the same as a session, since all wagering levels can participate in a single game) from the accepted bingo game requests. Next, the number of prizes to award for this bingo game are determined. A preferred embodiment is shown in FIG. 18, but any method meeting the requirements of the game are fully within the inventive scope of the present disclosure. Box 1908 is left for box 1910.

The actions corresponding to box 1910 are to generate an ordered ball draw set (a full ball draw for the game being played, in this exemplar 75 balls). Note that it is entirely possible to generate partial draws, but the preferred embodiment is draw a single full set at the start of game play. Box 1910 is left for box 1912.

The actions corresponding to box 1912 are those needed to generate subsets of the full ball draw, where the subset is the least number of balls possible needed to have at least one potential winning bingo event (pattern match) on a card enrolled in the game. Cards enrolled in the game are known either from the data stored in the game object for this game, or from the data in the issued card database. Box 1912 is left for box 1914.

The actions corresponding to box 1914 are those associated with sending the just chosen ball subset to each BPT having an enrolled bingo card thereon. Box 1916 is next, corresponding to the BPTs showing the balls sent by the BGM to the players. Continuing into box 1918, each BPT having received the ball subset and shown it to the player enables its daub button. Next are the actions corresponding to box 1920, which are those associated with setting and starting a daub timer for each enrolled BPT or active card thereon. Box 1920 is left and diamond 1922 is entered, where a player daub is checked. If a player having a potentially winning bingo event does not daub in time, the "No" exit is taken to diamond 1926. The decisions corresponding to diamond 1926 include the BGM checking to see how many potentially winning events have occurred. If the number of potentially winning events (this includes players who have daubed and have not daubed) is less than the number determined in box 1908, then the "No" exit is taken to box 1938. The actions corresponding to box 1938 are to display a prize lost message on the BPT. Further, in one preferred embodiment the card and associated BPT (if there is one card being played per BPT) are released from this game and are enabled for enrollment in a next bingo game upon the first non-daubing event. The dotted line connection back to box 1912 is shown for another preferred embodiment, where rather than ending the current bingo game the card with the lost winning event may continue to play for any other prizes they might win during further play of the same game.

Returning to diamond 1926, if the number of potential or possible winning events is equal to the number determined in box 1908, then the "Yes" exit is taken to box 1932. The actions corresponding to box 1932 include those of waiting for a player to daub, and the game remains open until a player does. Box 1934 is entered when a daub signal is received, further actions include awarding a prize from a prize pool at the same wager level as the enrolled card's current (played) wager level. The game is now over, corresponding to entry into "Game Over" box 1936.

Returning to diamond 1922, if the answer is "Yes" then the "Yes" exit is taken to box 1924. The actions corresponding to box 1924 are for the BPT to send the daub and related data to the BGM running the game, which checks the daub time, card ID, winning pattern, or other relevant data. Continuing into box 1928, a prize is selected from a prize pool at the same wagering level as the enrolled card ID (the player's wager level) and awarded to the player. In the currently preferred embodiment, the game (or just this specific game, if there is more than one) on the BPT having the winning card is now closed, enabling the player to immediately enroll in another game. Box 1928 is left for diamond 1930.

The actions corresponding to diamond 1930 include the BGM checking to see how many potentially winning events have occurred. If the number of potentially winning events (this includes players who have daubed and have not daubed) is less than the number determined in box 1908, then the "No" exit is taken back to box 1912, where the game session continues with the actions in box 1912 including the generation of a next ball sequence to send to currently (or still) enrolled cards/BPTs.

If the number of possible winning events is equal to the number of prizes generated in box 1908, then the "Yes" exit is taken to game end box 1936.

Other configurations using elements of the present invention in non-banked mode and in modified fashions will come to the mind of person skilled in this art and having the benefit of the present disclosure. All such configurations are within the inventive scope of the present disclosure.

Banked mode play of the bingo game system of the present invention differs from non-banked mode play primarily by removing from the game system certain constraints or constructs, coupled with only minor additions.

The most significant constraint that is not needed for banked-mode play as compared to non-banked mode is prize pools (although prize pools may be used, it is not a requirement). Prize pools enable the combination of fixed operator hold coupled with realistic mimicking of complex entertainment games, such as 5-reel 9-payline slot machines. In banked mode, the concept of operator hold does not apply. The players are now winning prizes paid by the house, and the wagering proceeds from bingo game play go to the house. RNG output is used at each bingo game win occurrence to generate a prize amount. Unlike traditional gaming machines this output does not determine a win or lose (that has already been determined by the bingo game play), rather, it only determines the amount won (or prize value equivalent, for other types of prizes such as jewelry, cars, trips, etc.). In the case of a simplistic exemplar game having the following payout template

| Prize | Quantity |
|---|---|
| $1,000 | 1 |
| $100 | 10 |
| $5 | 50 |

the output of the RNG would be mapped to 61 possible outcomes, each assigned a value according to the above chart. People skilled in the applicable mathematical arts associated with mapping or generating RNG into a win amount in accordance with paytables or templates, and having the benefit of the present disclosure, will be able to derive several methods of using paytables or templates and RNG output to generate a winning prize amount.

As with the modified non-banked game play discussed above and illustrated in FIG. 19, another option for banked bingo game play is the removal of the restriction of only allowing players to play against other players at the same wagering level. Without the concept of hold being needed at all (i.e., in banked mode, players are playing against the house), there is no longer any need to require bingo players to play bingo games with other players at the same wagering level. Once a bingo game winner is determined, the winnings will be generated from different templates, in accordance with the type of entertainment game being shown and the amount wagered. However, each bingo game may be played with players from any and all wagering levels.

Banked mode game play will be similar to that shown in FIG. 19, except that the method used to generate awards in FIG. 1928 is not based on prize pools, but is rather based on the output of an RNG and a prize template. Further, since operator hold is not required for banked play, it is possible to eliminate diamond 1926 and simply have a non-daubing player lose. This further eliminates boxes 1932 and 1934, and eliminates the dotted line connection from box 1938 to box 1912. Further, the number of prizes of determined in box 1208 is open to any algorithm or mapping of RNG output into a template, with the constraint that there is at least one winning event per game.

In banked mode, bonusing patterns may simply be added as payouts on the art glass of the bingo game; no specific percentage of player's wager amount need to put into a pool, the pool calculated to have a specified payout to the players over time, as the player is now playing against the house.

Although the description above contains many specificities, these should not be construed as limiting the scope of the invention but rather as providing an illustration of presently preferred embodiments of the invention. The scope of this invention is determined by the following claims and their legal equivalents.

What is claimed:

1. A bingo gaming system comprising:

at least one bingo game manager configured to define a non-bingo game of chance having a set of non-bingo winning outcomes and associated non-bingo prizes, to create a bingo game prize pool comprising elements generated according to the probabilities of the set of non-bingo winning outcomes, each element including a bingo game winning outcome and a bingo prize equal to its generating non-bingo prize; and one or more player terminals configured to present the bingo game to one or more players until at least one of the selected elements' bingo game winning outcome occurs, and to display a non-bingo winning outcome associated with a non-bingo prize equal to the bingo prize associated with the occurring bingo winning outcome.

2. The system of claim 1 wherein at least one of the non-bingo prizes and associated non-bingo game outcomes comprises a bonus game prize and bonus game play.

3. The system of claim 2 wherein the bonus game play is randomly selected by the one of more player terminals from a set of potentially matching bonus game plays, each of the set having a non-bingo prize equal to the bingo prize associated with the occurring bingo winning outcome.

4. The system of claim 1 wherein at least one of the non-bingo prizes and associated bingo prizes comprise a progressive award.

5. The system of claim 1 wherein the bingo prize associated with the occurring bingo outcome is returned to the prize pool in the event the bingo game winning outcome is not daubed at the one of more player terminals.

6. The system of claim 1 wherein the bingo prize associated with the occurring bingo outcome is allocated to a progressive prize pool associated with the bingo game in the event the bingo game winning outcome is not daubed at the one or more player terminals.

7. The system of claim 1 wherein the non-bingo winning outcome is randomly selected from a set of potentially matching non-bingo winning outcomes, each of the set having a non-bingo prize equal to the bingo prize associated with the occurring bingo winning outcome.

8. A bingo gaming system comprising:

at least one bingo game manager configured to define a non-bingo game of chance having a set of non-bingo winning outcomes and associated non-bingo prizes and further configured to create a bingo game prize pool template comprising elements generated according to the probabilities of the set of non-bingo winning outcomes, each element including a bingo game winning outcome and a bingo prize equal to its generating non-bingo prize, to create a plurality of bingo game prize pools from the template; and one or more player terminals configured to present the bingo game to one or more players until at least one of the selected elements' bingo game winning outcome occurs and further configured to display a non-bingo winning outcome associated with a non-bingo prize equal to the bingo prize associated with the occurring bingo winning outcome.

9. The system of claim 8 wherein at least one of the non-bingo prizes and associated non-bingo game outcomes comprises a bonus game prize and bonus game play.

10. The system of claim 9 wherein the bonus game play is randomly selected from a set of potentially matching bonus game plays, each of the set having a non-bingo prize equal to the bingo prize associated with the occurring bingo winning outcome.

11. The system of claim 8 wherein at least one of the non-bingo prizes and associated bingo prizes comprise a progressive award.

12. The system of claim 8 wherein the bingo prize associated with the occurring bingo outcome is returned to the prize pool in the event that the bingo game winning outcome is not daubed.

13. The system of claim 8 further comprising allocation of the bingo prize associated with the occurring bingo outcome to a progressive prize pool associated with the bingo game in the event the bingo game winning outcome is not daubed.

14. The system of claim 8 wherein the non-bingo winning outcome is randomly selected from a set of potentially matching non-bingo winning outcomes, each of the set having a non-bingo prize equal to the bingo prize associated with the occurring bingo winning outcome.

* * * * *